United States Patent
Akkarakaran et al.

(10) Patent No.: US 12,047,124 B2
(45) Date of Patent: *Jul. 23, 2024

(54) GROUP DELAY CALIBRATION FOR CARRIER AGGREGATION / MULTI-RADIO ACCESS TECHNOLOGY

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,216

(22) Filed: Apr. 21, 2023

(65) Prior Publication Data

US 2023/0254057 A1    Aug. 10, 2023

Related U.S. Application Data

(63) Continuation of application No. 17/074,522, filed on Oct. 19, 2020, now Pat. No. 11,658,756, which is a
(Continued)

(51) Int. Cl.
*H04W 4/029* (2018.01)
*G01S 5/02* (2010.01)
(Continued)

(52) U.S. Cl.
CPC ......... *H04B 17/364* (2015.01); *H04B 17/104* (2015.01); *H04B 17/14* (2015.01); *H04W 64/00* (2013.01); *H04W 88/10* (2013.01)

(58) Field of Classification Search
None
See application file for complete search history.

(56) References Cited

U.S. PATENT DOCUMENTS 6,368,279 B1    4/2002  Liu
6,490,456 B1 *  12/2002 Bogdan ................. H04W 64/00
                                                342/450

(Continued)

FOREIGN PATENT DOCUMENTS

| CN | 103535109 A | 1/2014 |
| EP | 0911993 A2 | 4/1999 |
| EP | 1093318 A2 | 4/2001 |

OTHER PUBLICATIONS

International Search Report and Written Opinion—PCT/US2019/060594—ISA/EPO—dated Apr. 28, 2020.

*Primary Examiner* — Tuan A Tran
(74) *Attorney, Agent, or Firm* — QUALCOMM Incorporated

(57) ABSTRACT

Disclosed are techniques for handling of radio frequency (RF) front-end group delays for roundtrip time (RTT) estimation. In an aspect, a network node transmits first and second RTT measurement (RTTM) signals to a user equipment (UE) and receives first and second RTT response (RTTR) signals from the UE. The network node measures the transmission times of the RTTM signals and the reception times of the RTTR signals, and the UE measures the transmission times the RTTM signals and the transmission times of the RTTR signals. The group delays of the transmit/receive chains of the network node and the UE are determined for one set of transmit/receive chains based on the first RTTM signal and first RTTR signal. The group delays of the transmit/receive chain used for the second RTTM signal and the second RTTR signal are determined relative to the group delay of the one set of transmit/receive chains.

30 Claims, 17 Drawing Sheets

Related U.S. Application Data continuation of application No. 16/677,624, filed on Nov. 7, 2019, now Pat. No. 10,848,256.

(60) Provisional application No. 62/757,731, filed on Nov. 8, 2018.

(51) Int. Cl.
*H04B 17/10* (2015.01)
*H04B 17/14* (2015.01)
*H04B 17/364* (2015.01)
*H04W 64/00* (2009.01)
*H04W 88/10* (2009.01)

(56) References Cited

U.S. PATENT DOCUMENTS

| | | | |
|---|---|---|---|
| 6,681,099 B1* | 1/2004 | Keranen | G01S 13/765 455/67.16 |
| 7,466,266 B2 | 12/2008 | Opshaug | |
| 8,326,324 B2* | 12/2012 | Wu | H04W 64/00 455/456.2 |
| 8,335,289 B2 | 12/2012 | Park et al. | |
| 8,339,972 B2* | 12/2012 | Hirsch | H04L 63/00 370/248 |
| 8,837,316 B2 | 9/2014 | Zhang et al. | |
| 8,879,564 B2* | 11/2014 | Ryu | H04L 43/0864 370/400 |
| 8,880,096 B2 | 11/2014 | Rousu et al. | |
| 8,885,473 B2* | 11/2014 | Chan | H04L 43/0882 370/234 |
| 8,948,063 B2 | 2/2015 | Aryan et al. | |
| 9,143,418 B2* | 9/2015 | Den Hartog | H04L 43/0882 |
| 9,185,670 B2* | 11/2015 | Siomina | H04W 56/0055 |
| 9,277,369 B2 | 3/2016 | Lindskog et al. | |
| 9,288,625 B2 | 3/2016 | Lindskog et al. | |
| 9,547,068 B2 | 1/2017 | Do et al. | |
| 9,648,573 B2 | 5/2017 | Siomina et al. | |
| 9,705,770 B2 | 7/2017 | Cavaliere et al. | |
| 9,949,160 B2 | 4/2018 | Fischer | |
| 10,039,073 B2 | 7/2018 | Kakani et al. | |
| 10,057,147 B2* | 8/2018 | Park | H04L 47/27 |
| 10,419,324 B2* | 9/2019 | Burbridge | H04L 41/5009 |
| 10,505,653 B1 | 12/2019 | Berger et al. | |
| 10,547,979 B2* | 1/2020 | Edge | G01S 5/02 |
| 10,554,568 B2* | 2/2020 | Flajslik | H04L 41/0893 |
| 10,686,573 B2* | 6/2020 | Jung | H04L 1/1854 |
| 10,848,256 B2 | 11/2020 | Akkarakaran et al. | |
| 11,096,141 B2 | 8/2021 | Fang | |
| 11,159,972 B2 | 10/2021 | Akkarakaran et al. | |
| 2003/0026239 A1 | 2/2003 | Abe et al. | |
| 2012/0295623 A1* | 11/2012 | Siomina | G01S 5/0263 455/436 |
| 2015/0350946 A1 | 12/2015 | Das et al. | |
| 2016/0095104 A1 | 3/2016 | Chen et al. | |
| 2016/0323799 A1* | 11/2016 | Morgan | H04W 4/12 |
| 2017/0188248 A1 | 6/2017 | Muller et al. | |
| 2019/0245663 A1* | 8/2019 | Kim | H04L 27/2663 |
| 2019/0312689 A1* | 10/2019 | Opshaug | G01S 1/042 |
| 2020/0021949 A1* | 1/2020 | Edge | G01S 5/0236 |
| 2020/0120009 A1* | 4/2020 | Im | H04W 24/02 |
| 2021/0036790 A1 | 2/2021 | Akkarakaran et al. | |
| 2022/0007226 A1 | 1/2022 | Akkarakaran et al. | |

* cited by examiner

GROUP DELAY CALIBRATION FOR CARRIER AGGREGATION / MULTI-RADIO ACCESS TECHNOLOGY

CROSS-REFERENCE TO RELATED APPLICATION

The present application for patent is a continuation of U.S. Non-Provisional patent application Ser. No. 17/074,522, entitled "GROUP DELAY CALIBRATION FOR CARRIER AGGREGATION/MULTI-RADIO ACCESS TECHNOLOGY," filed Oct. 19, 2020, which is a continuation of U.S. Non-Provisional patent application Ser. No. 16/677,624, entitled "GROUP DELAY CALIBRATION FOR CARRIER AGGREGATION/MULTI-RADIO ACCESS TECHNOLOGY," filed Nov. 7, 2019, which claims the benefit of U.S. Provisional Patent Application No. 62/757,731 entitled "GROUP DELAY CALIBRATION FOR CARRIER AGGREGATION/MULTI-RADIO ACCESS TECHNOLOGY," filed Nov. 8, 2018, each of which is assigned to the assignee hereof, and expressly incorporated herein by reference in its entirety.

TECHNICAL FIELD

Various aspects described herein generally relate to wireless communication systems, and more particularly, to group delay calibration for carrier aggregation (CA)/multi-radio access technology (multi-RAT).

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device can also be configured to report time of arrival (ToA) of RF signals.

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

In an aspect, a network node includes one or more transceivers, one or more memory components, and one or more processors communicatively coupled to the one or more transceivers and the one or more memory components, the one or more processors configured to: transmit, via the one or more transceivers, a first measurement signal on measurement resources comprising downlink physical layer resources, receive, via the one or more transceivers, a first response signal on response resources comprising uplink physical layer resources, the first response signal corresponding to the first measurement signal, determine a first network node group delay (GD) based on the first measurement signal and the first response signal, transmit, via the one or more transceivers, a second measurement signal on measurement resources comprising downlink physical layer resources, the first and second measurement signals being on different frequencies and/or delivered via different radio access technologies (RATs), receive, via the one or more transceivers, a second response signal on response resources comprising uplink physical layer resources, the second response signal corresponding to the second measurement signal, and determine a round-trip-time (RTT) between a user equipment (UE) and the network node based on the second measurement signal, the second response signal, and the first network node GD.

In an aspect, a UE includes one or more transceivers, one or more memory components, and one or more processors communicatively coupled to the one or more transceivers and the one or more memory, the one or more processors configured to: obtain a first UE GD associated with a first frequency or a first RAT, receive, from a network node via the one or more transceivers, a measurement signal on measurement resources comprising downlink physical layer resources, the measurement signal received on a second frequency and/or via a second RAT, transmit, to the network node via the one or more transceivers, a response signal on response resources comprising uplink physical layer resources, the second response signal corresponding to the second measurement signal, and enable an RTT between the UE and the network node to be determined based on the measurement signal, the response signal, and the first UE GD.

In an aspect, a method of operating a network node includes transmitting a first measurement signal on measurement resources comprising downlink physical layer resources, receiving a first response signal on response resources comprising uplink physical layer resources, the first response signals corresponding to the first measurement signals, determining a first network node GD based on the first measurement signal and the first response signal, transmitting, to the UE, a second measurement signal on measurement resources comprising downlink physical layer resources, the first and second measurement signals being on different frequencies and/or delivered via different RATs, receiving, from the UE, a second response signal on response resources comprising uplink physical layer resources, the second response signal corresponding to the second measurement signal, determining an RTT between the UE and the network node based on the second measurement signal, the second response signal, and the first network node GD.

In an aspect, a method of operating a UE includes obtaining a first UE GD associated with a first frequency or a first RAT, receiving, from a network node, a measurement signal on response resources comprising downlink physical layer resources, the measurement signal received on a second frequency and/or via a second RAT, transmitting, to the network node, a response signal on response resources comprising uplink physical layer resources, the response signal corresponding to the measurement signal, and enabling an RTT between the UE and the network node to be determined based on the measurement signal, the response signal, and the first UE GD.

In an aspect, a network node includes means for transmitting a first measurement signal on measurement resources comprising downlink physical layer resources, means for receiving a first response signal on response resources comprising uplink physical layer resources, the first response signals corresponding to the first measurement signals, means for determining a first network node GD based on the first measurement signal and the first response signal, means for transmitting, to the UE, a second measurement signal on measurement resources comprising downlink physical layer resources, the first and second measurement signals being on different frequencies and/or delivered via different RATs, means for receiving, from the UE, a second response signal on response resources comprising uplink physical layer resources, the second response signal corresponding to the second measurement signal, and means for determining an RTT between the UE and the network node based on the second measurement signal, the second response signal, and the first network node GD.

In an aspect, a UE includes means for obtaining a first UE GD associated with a first frequency or a first RAT, means for receiving, from a network node, a measurement signal on response resources comprising downlink physical layer resources, the measurement signal received on a second frequency and/or via a second RAT, means for transmitting, to the network node, a response signal on response resources comprising uplink physical layer resources, the response signal corresponding to the measurement signal, and means for enabling an RTT between the UE and the network node to be determined based on the measurement signal, the response signal, and the first UE GD.

In an aspect, a non-transitory computer-readable medium storing computer-executable instructions includes computer-executable instructions comprising at least one instruction instructing a network node to transmit a first measurement signal on measurement resources comprising downlink physical layer resources, at least one instruction instructing the network node to receive a first response signal on response resources comprising uplink physical layer resources, the first response signals corresponding to the first measurement signals, at least one instruction instructing the network node to determine a first network node GD based on the first measurement signal and the first response signal, at least one instruction instructing the network node to transmit, to the UE, a second measurement signal on measurement resources comprising downlink physical layer resources, the first and second measurement signals being on different frequencies and/or delivered via different RATs, at least one instruction instructing the network node to receive, from the UE, a second response signal on response resources comprising uplink physical layer resources, the second response signal corresponding to the second measurement signal, and at least one instruction instructing the network node to determine an RTT between the UE and the network node based on the second measurement signal, the second response signal, and the first network node GD.

In an aspect, a non-transitory computer-readable medium storing computer-executable instructions includes computer-executable instructions comprising at least one instruction instructing a UE to obtain a first UE GD associated with a first frequency or a first RAT, at least one instruction instructing the UE to receive, from a network node, a measurement signal on response resources comprising downlink physical layer resources, the measurement signal received on a second frequency and/or via a second RAT, at least one instruction instructing the UE to transmit, to the network node, a response signal on response resources comprising uplink physical layer resources, the response signal corresponding to the measurement signal, and at least one instruction instructing the UE to enable an RTT between the UE and the network node to be determined based on the measurement signal, the response signal, and the first UE GD.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
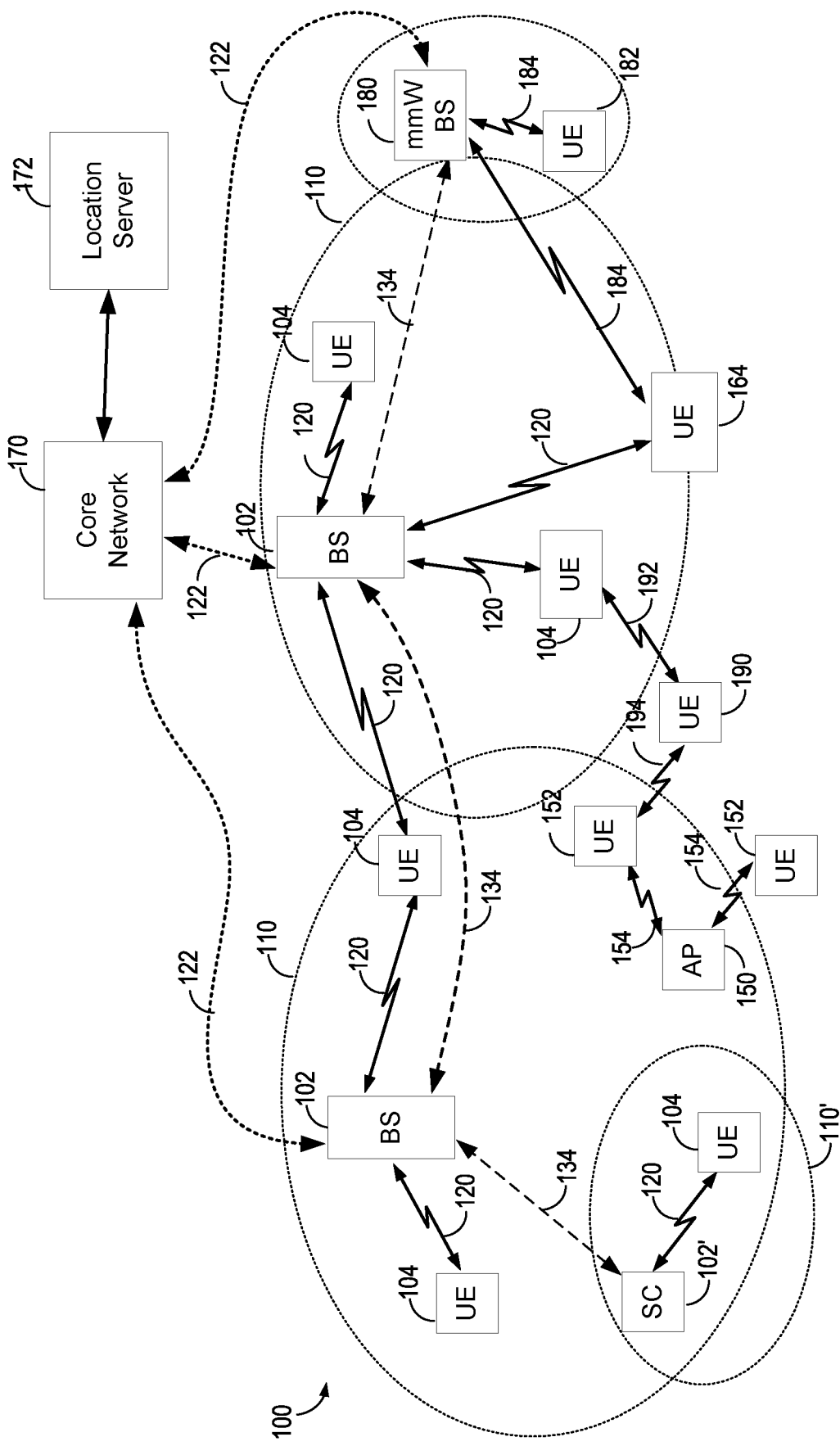
FIG. 1 illustrates an exemplary wireless communications system, according to various aspects.

Aspects of the subject matter are provided in the following description and related drawings directed to specific examples of the disclosed subject matter. In particular, various aspects described herein relate to handling of radio frequency (RF) front-end group delays for roundtrip time (RTT) estimation. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
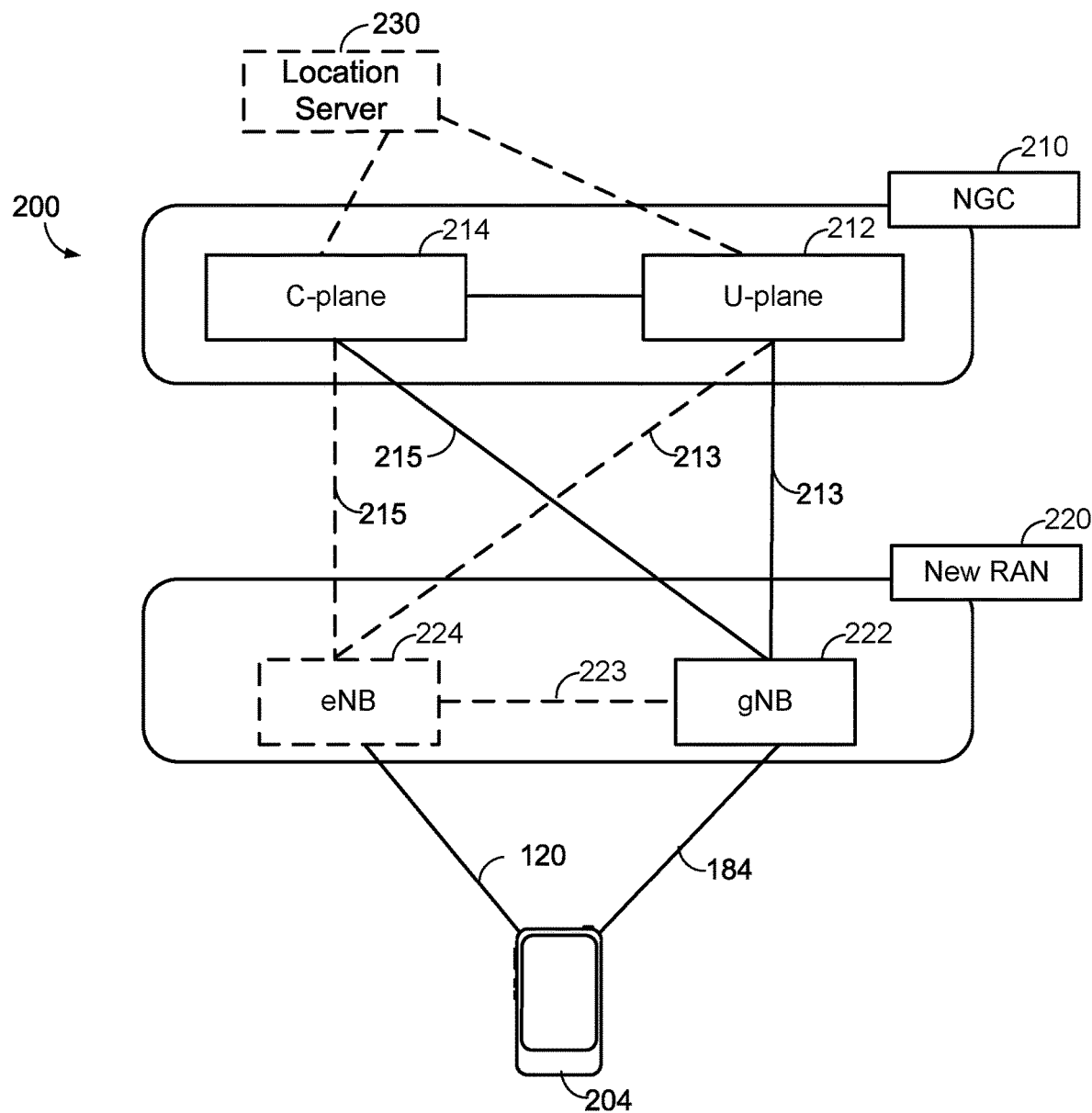
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated).

Further, the location server 230 may be integrated into a component of the core network, or alternatively may be external to the core network.

Figure 2B:
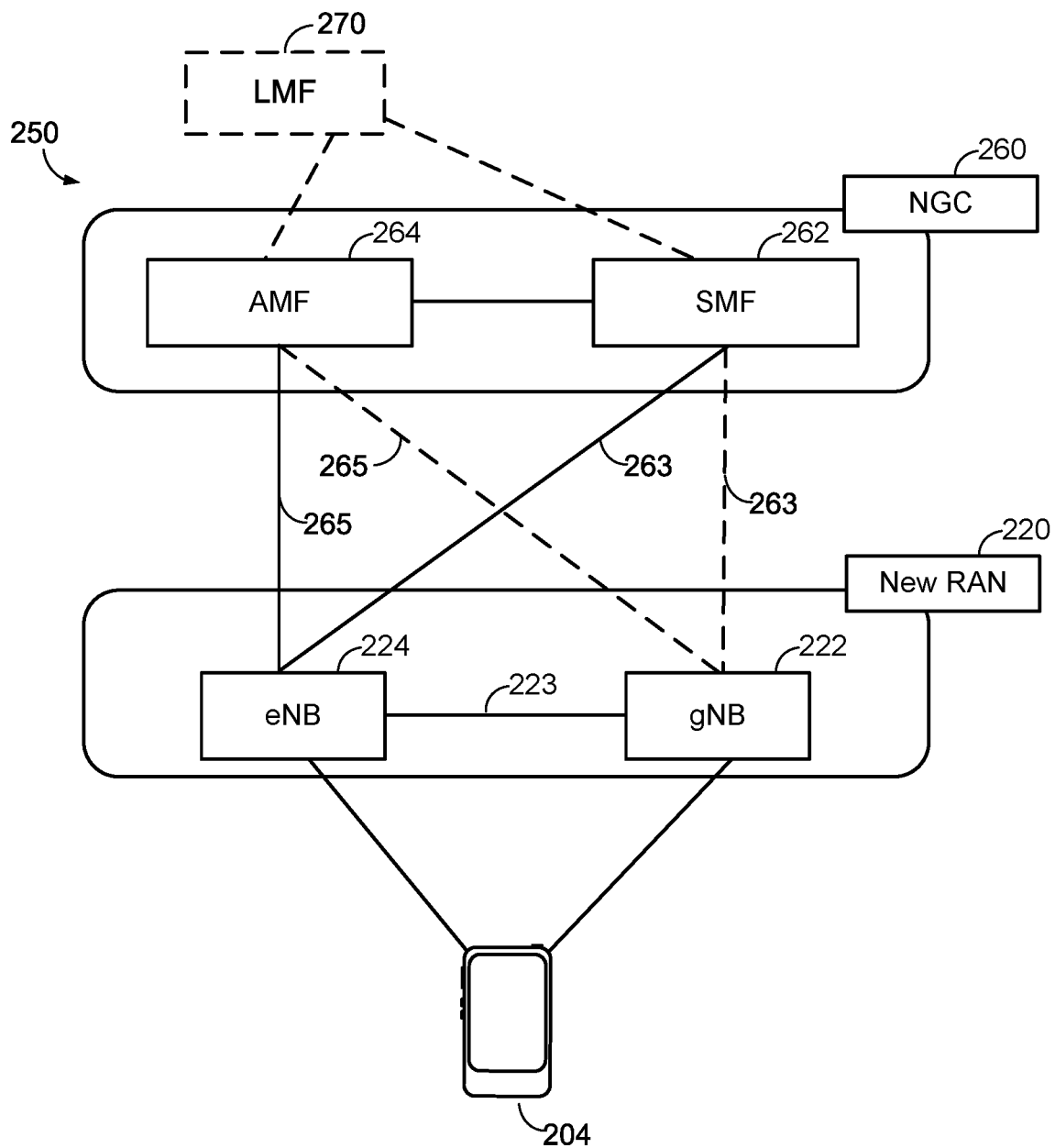

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
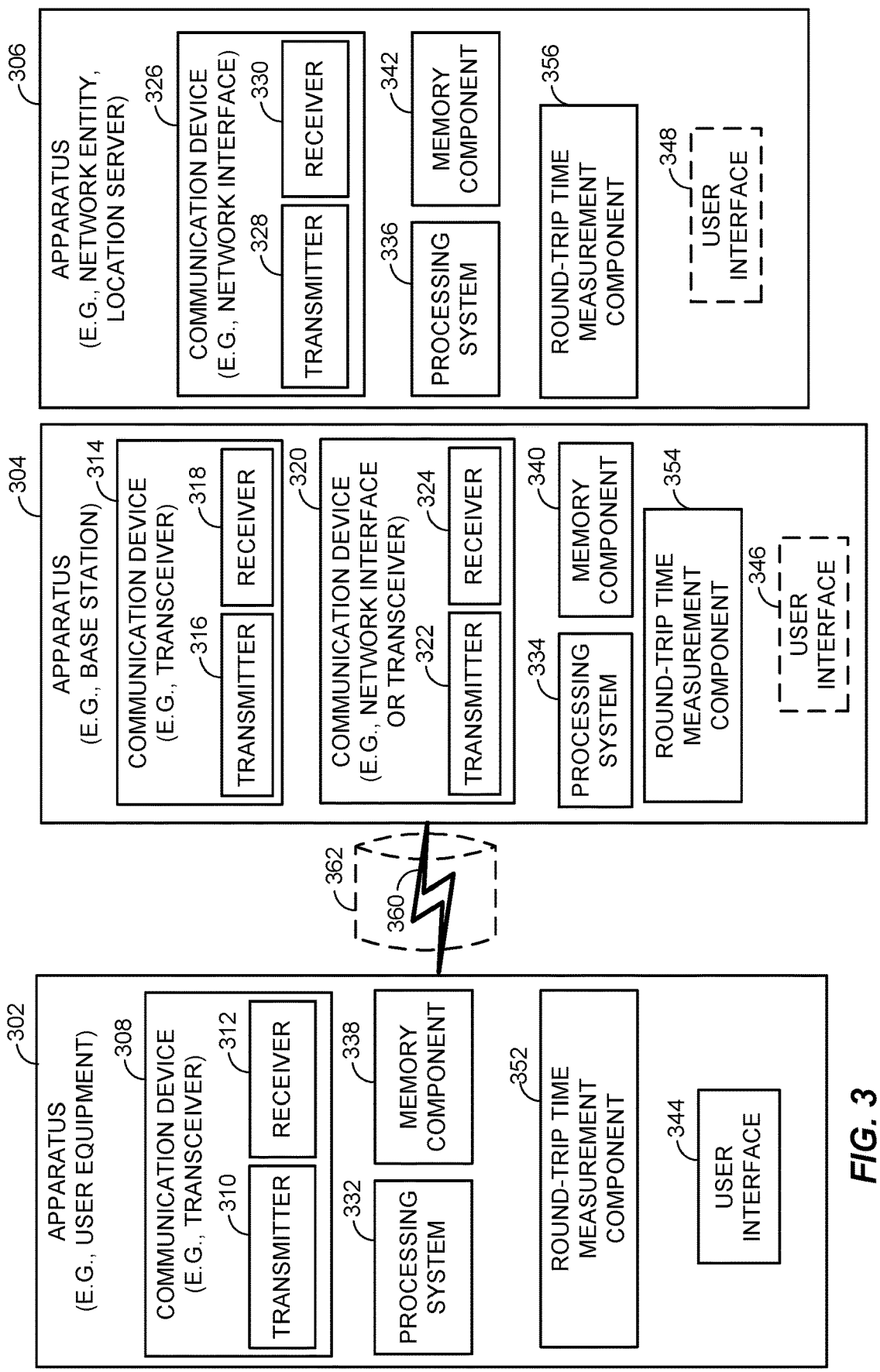
FIG. 3 is a simplified block diagram of several sample aspects of components that may be employed in wireless communication nodes and configured to support communication as taught herein.

FIG. 3 illustrates several sample components (represented by corresponding blocks) that may be incorporated into an apparatus 302, an apparatus 304, and an apparatus 306 (corresponding to, for example, a UE, a base station (e.g., a gNodeB), and a network entity or location server, respectively) to support the operations as disclosed herein. As an example, the apparatus 302 may correspond to a UE 104, 152, 164, 182, 190, the apparatus 304 may correspond to a base station 102/180, and the apparatus 306 may correspond to the location server 230, LMF 270, AMF 264, SMF 262. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 302 and the apparatus 304 each include at least one wireless communication device (represented by the communication devices 308 and 314) for communicating with other nodes via at least one designated RAT (e.g., LTE, 5G NR). Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on).

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 304 may also comprise a Network Listen Module (NLM) or the like for performing various measurements.

The apparatus 304 and the apparatus 306 include at least one communication device (represented by the communication device 320 and the communication device 326) for communicating with other nodes. For example, the communication device 326 may comprise a network interface (e.g., one or more network access ports) that is configured to communicate with one or more network entities via a wire-based or wireless backhaul connection. In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330 (e.g., network access ports for transmitting and receiving). Similarly, the communication device 320 may comprise a network interface that is configured to communicate with one or more network entities via a wire-based or wireless backhaul. As with the communication device 326, the communication device 320 is shown as comprising a transmitter 322 and a receiver 324.

The apparatuses 302, 304, and 306 also include other components that may be used in conjunction with the operations as disclosed herein. The apparatus 302 includes processor circuitry implementing a processing system 332 for providing functionality relating to, for example, RTT measurements in a licensed or unlicensed frequency band as disclosed herein and for providing other processing functionality. The apparatus 304 includes a processing system 334 for providing functionality relating to, for example, RTT measurements in a licensed or unlicensed frequency band as disclosed herein and for providing other processing functionality. The apparatus 306 includes a processing system 336 for providing functionality relating to, for example, RTT measurements in a licensed or unlicensed frequency band as disclosed herein and for providing other processing functionality. In an aspect, the processing systems 332, 334, and 336 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 338, 340, and 342 (e.g., each including a memory device), respectively, for maintaining information (e.g., information indicative of reserved resources, thresholds, parameters, and so on). In addition, the apparatuses 302, 304, and 306 include user interface devices 344, 346, and 348, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304, and/or 306 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, and 344 may be implemented by processor and memory component(s) of the apparatus 302 (e.g., by execution of appropriate code and/or by appropriate configuration of processor components). Similarly, some or all of the functionality represented by blocks 314, 320, 334, 340, and 346 may be implemented by processor and memory component(s) of the apparatus 304 (e.g., by execution of appropriate code and/or by appropriate configuration of processor components). Also, some or all of the functionality represented by blocks 326, 336, 342, and 348 may be implemented by processor and memory component(s) of the apparatus 306 (e.g., by execution of appropriate code and/or by appropriate configuration of processor components).

In an aspect, the apparatus 304 may correspond to a "small cell" or a Home gNodeB. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with another RAN and/or other APs and UEs. In general, the apparatus 302 and the apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by WLAN technologies, most notably IEEE 802.11x WLAN technologies generally referred to as "Wi-Fi," and LTE in unlicensed spectrum technologies generally referred to as "LTE-U" or "MuLTE-Fire."

Apparatus 302 may also include an RTT measurement component 352 that may be used to obtain location related measurements of signals (e.g., RTT or other signals) transmitted by a base station or AP (e.g., any of base stations 102, 180) according to techniques described herein. Location related measurements may include measurements of signal propagation time or RTT between a UE 104 and a base station or AP, such as any of base stations 102, 180.

Apparatus 304 and 306 may each include RTT measurement component 354 and 356, respectively, which may be used to determine a location estimate for a UE 104 (e.g., apparatus 302), according to techniques described herein, based on location related measurements provided by the UE 104 and/or by a base station or AP, such as any of base stations 102, 180. Location related measurements obtained by the UE 104 may include measurements of signal propagation time or RTT between a UE 104 and a base station or AP, such as any of base stations 102, 180. Location related measurements obtained by any of base stations 102, 180 (e.g., apparatus 304) may include measurements of signal propagation time or RTT between the UE 104 and a base station or AP, such as any of base stations 102, 180.

Figure 4:
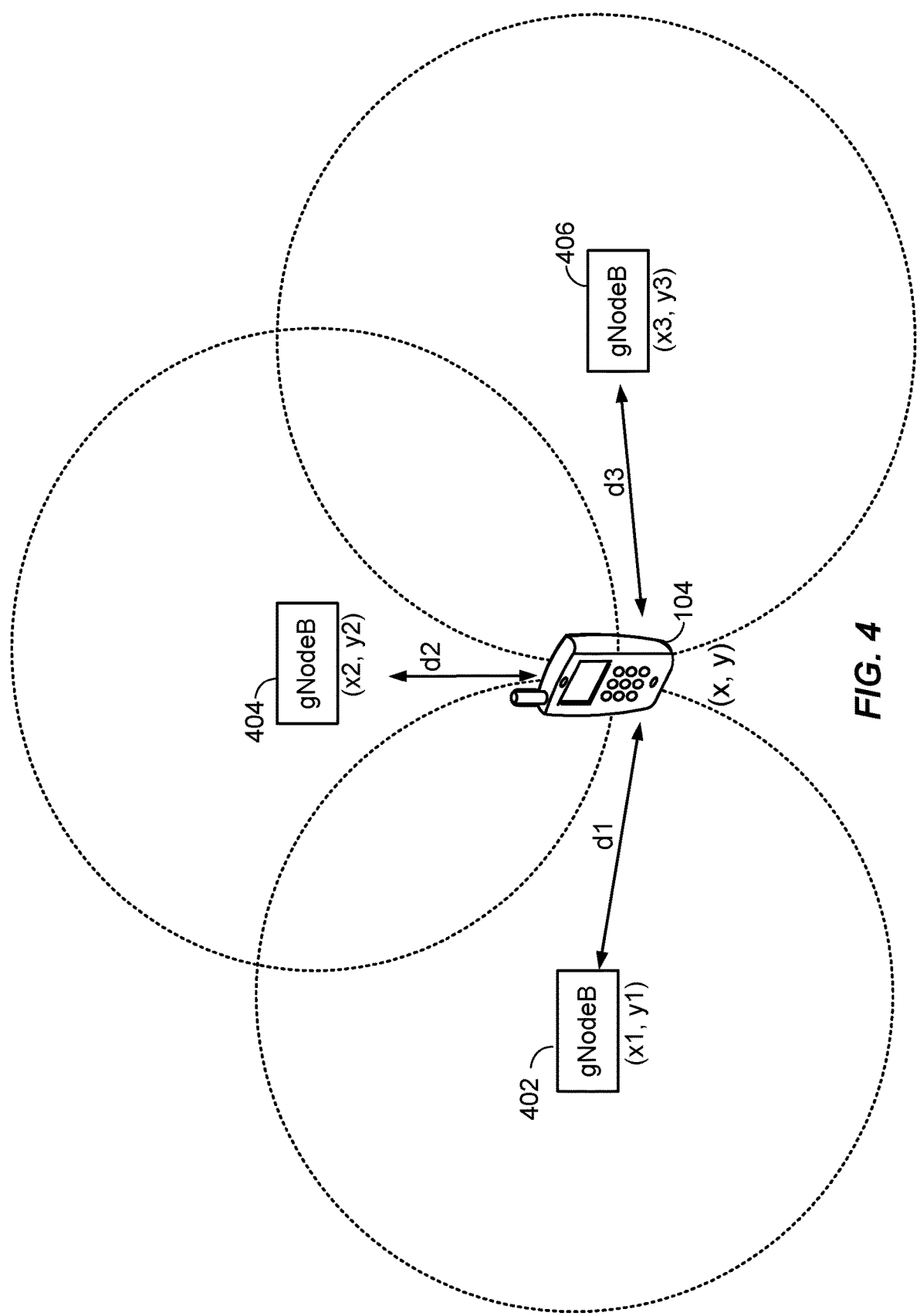
FIG. 4 is a diagram illustrating an exemplary technique for determining a position of a mobile station using information obtained from a plurality of base stations.

A simplified environment is shown in FIG. 4 for illustrating an exemplary technique for determining a position of a UE 104. The UE 104 may communicate wirelessly with a plurality of gNodeBs 402-406 using radio frequency (RF) signals and standardized protocols for the modulation of the RF signals and the exchanging of information packets. By extracting different types of information from the exchanged signals, and utilizing the layout of the network (i.e., the network geometry) the UE 104 or any of the gNodeBs 402-406 may determine the UE 104's position in a predefined reference coordinate system. As shown in FIG. 4, the position (x, y) of the UE 104 may be specified using a two-dimensional coordinate system; however, the aspects disclosed herein are not so limited, and may also be applicable to determining positions using a three-dimensional coordinate system, if the extra dimension is desired. Additionally, while three gNodeBs 402-406 are shown in FIG. 4, aspects may utilize additional gNodeB s.

If the UE 104 is to determine its position (x, y), the UE 104 may first need to determine the network geometry. The network geometry can include the positions of each of the gNodeBs 402-406 in a reference coordinate system ($(x_k, y_k)$, where k=1, 2, 3). The network geometry may be provided to the UE 104 in any manner, such as, for example, providing this information in beacon signals, providing the information using a dedicated server external on an external network, providing the information using uniform resource identifiers, providing the information through base station almanac (BSA), etc.

In determining the position of the UE 104, whether by the UE 104 (UE-based) or by the network (UE-assisted), a distance ($d_k$, where k=1, 2, 3) of the UE 104 to each of the gNodeBs 402-406 is determined. As will be described in more detail below, there are a number of different approaches for estimating these distances ($d_k$) by exploiting different characteristics of the RF signals exchanged between the UE 104 and gNodeBs 402-406. Such characteristics may include, as will be discussed below, the roundtrip propagation time of the signals, and/or the strength of the signals (RSSI).

In other aspects, the distances ($d_k$) may in part be determined or refined using other sources of information that are not associated with the gNodeBs 402-406. For example, other positioning systems, such as GPS, may be used to provide a rough estimate of $d_k$. (Note that it is likely that GPS may have insufficient signal in the anticipated operating environments (indoors, metropolitan, etc.) to provide a consistently accurate estimate of $d_k$. However GPS signals may be combined with other information to assist in the position determination process.) Other relative positioning devices may reside in the UE 104 which can be used as a basis to provide rough estimates of relative position and/or direction (e.g., on-board accelerometers).

Once each distance $d_k$ is determined, the UE 104's position (x, y) may be solved by using a variety of known geometric techniques, such as, for example, trilateration. From FIG. 4, it can be seen that the position of the UE 104 ideally lies at the intersection of the circles drawn using dotted lines. Each circle being defined by radius $d_k$ and center ($x_k, y_k$), where k=1, 2, 3. In practice, the intersection of these circles may not lie at a single point due to the noise and other errors in the networking system.

Determining the distance between the UE 104 and each gNodeB 402-406 may involve exploiting time information of the RF signals. In an aspect, determining the RTT of signals exchanged between the UE 104 and a gNodeB 402-406 can be performed and converted to a distance ($d_k$). RTT techniques can measure the time between sending a data packet and receiving a response. These methods utilize calibration to remove any processing delays. In some environments, it may be assumed that the processing delays for the UE 104 and the gNodeBs 402-406 are the same. However, such an assumption may not be true in practice.

A position estimate (e.g., for a UE 104) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5A:
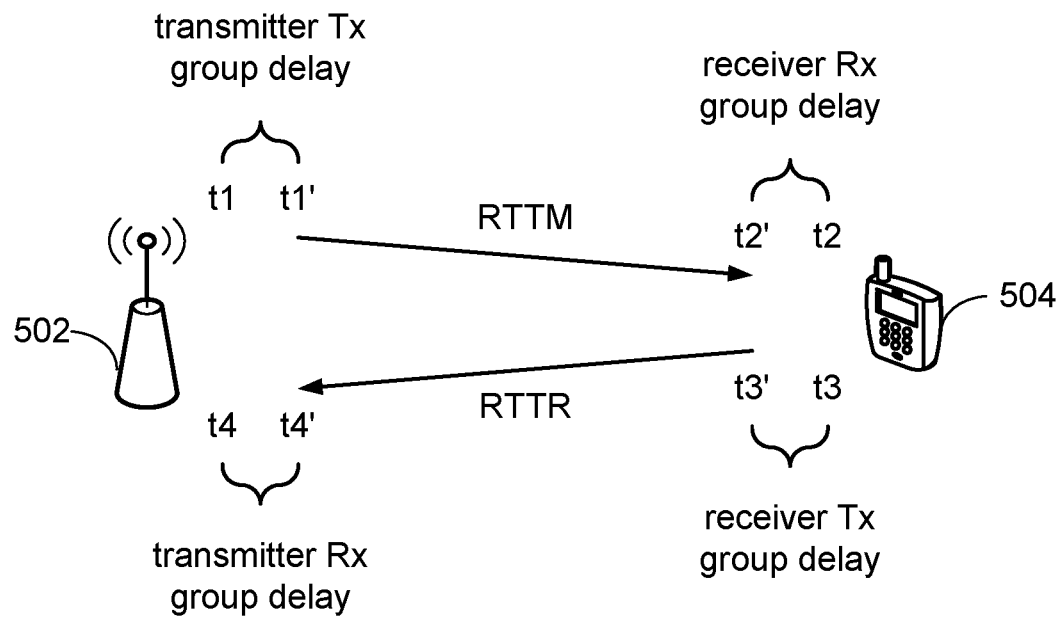
FIG. 5A illustrates a scenario for determining RTT between a transmitter and a receiver.
Figure 5B:
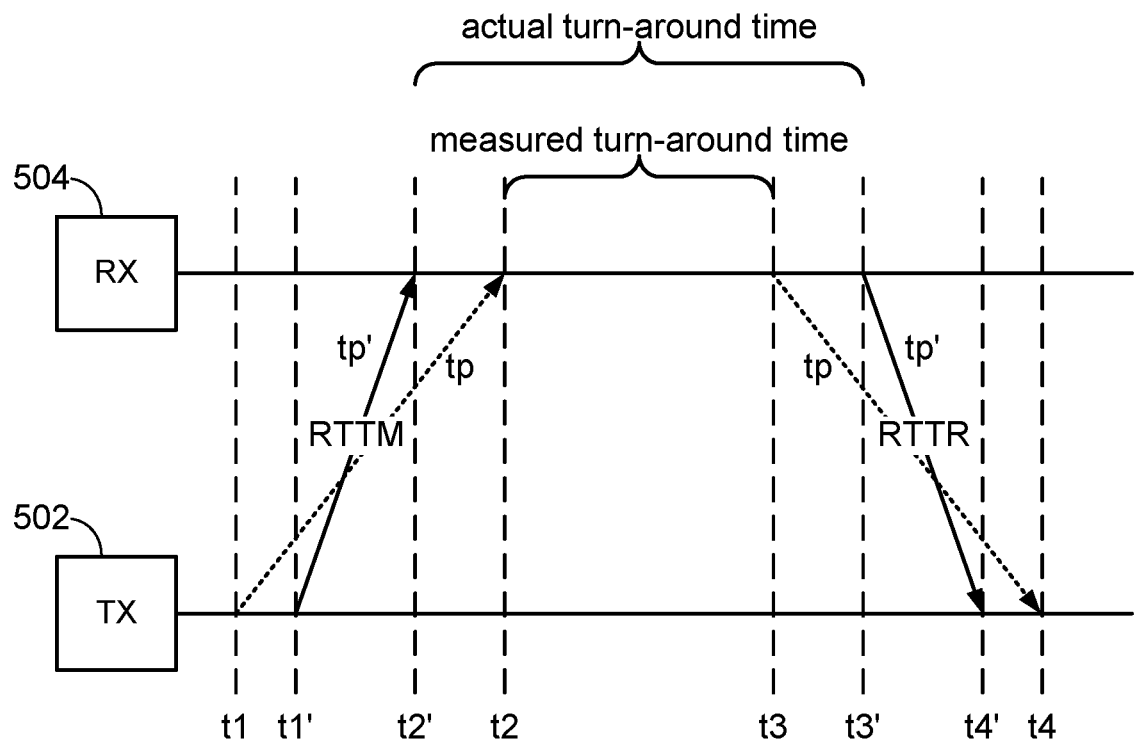
FIG. 5B is a diagram showing exemplary timings within an RTT occurring in the scenario of FIG. 5A during a wireless probe request and a response.

FIG. 5A illustrates an RTT scenario between a transmitter 502 and a receiver 504, and FIG. 5B is a diagram 500 showing exemplary timings within an RTT occurring during a wireless probe request and a response between the transmitter 502 and the receiver 504. For a network centric (UE-assisted) RTT determination, the transmitter 502 may correspond to a network node (e.g., any of the gNodeBs 402-406) and the receiver 504 may correspond to the UE 104. For a UE centric RTT determination, the transmitter 502 may correspond to the UE 104 and the receiver 504 may correspond to the network node. In an aspect, the response may take the form of an acknowledgement packet (ACK); however, any type of response packet would be consistent with various aspects of the disclosure. For example, a Request to Send (RTS) transmit packet and/or Clear to Send (CTS) response packet may be suitable.

To determine the RTT between the transmitter 502 and the receiver 504, the transmitter 502 sends an RTT Measurement (RTTM) signal at time t1. After some propagation time, the receiver 504 detects that the RTTM signal is received at time t2. The RTTM signal may include a waveform, and may also include a payload. The RTTM waveform allows the receiver 504 to determine the time t2. Subsequently, the receiver 504 takes some turn-around time A to process the received RTTM signal before sending an RTT Response (RTTR) signal at time t3. After the propagation time, the transmitter 502 detects that the RTTR signal is received at time t4. The RTTR signal may include a waveform and a payload. The RTTR waveform allows the transmitter 502 to determine the time t4. Thus, the measured flight time or RTT may be calculated as:

$$\text{measured RTT} = (t4-t1)-(t3-t2), \quad (1)$$

where (t4–t1) is the measured total time, and (t3–t2) is the measured turn-around time at the receiver 504. Alternatively, the measured RTT may also be calculated as:

$$\text{measured RTT} = (t4-t1)+(t2-t3), \quad (1a)$$

where (t2–t3) may be reported and/or utilized to determine the RTT. For ease of reference, the times t1 and t2 may respectively be referred to as measured RTTM Tx and Rx times, and the times t3 and t4 may respectively be referred to as measured RTTR Tx and Rx times.

However, the times t1, t2, t3 and t4 are the times as measured or otherwise determined by transmitter 502 and the receiver 504 in the digital domain. But in reality, the RTTM waveform actually leaves the transmitter 502 at time t1' and arrives at the receiver 504 at time t2'. Also, the RTTR waveform actually leaves the receiver 504 at time t3' and arrives at the transmitter 502 at time t4'. This means that the actual flight time or RTT is as follows:

$$\text{actual RTT} = (t4'-t1')-(t3'-t2'), \quad (2)$$

or $$\text{actual RTT} = (t4'-t1')+(t2'-t3'), \quad (2a)$$

where (t4'–t1') is the actual total time, and (t3'–t2') (or (t2'–t3')) is representative of the actual turn-around time at the receiver 504. For ease of reference, the times t1' and t2' may respectively be referred to as actual RTTM Tx and Rx times, and the times t3' and t4' may respectively be referred to as actual RTTR Tx and Rx times.

The discrepancy between the measured and actual times is explained as follows. In wireless communications, a source device (or simply "source") transmits signals to a destination device (or simply "destination"). In order to transmit a digital signal, a transmit (Tx) RF chain (also referred to as RF front end (RFFE)) of the source performs a process to convert the digital signal into a radio frequency (RF) signal. For example, the source's Tx RF chain can include a digital-to-analog converter (DAC) to convert the digital signal into a baseband analog signal, an upconverter to upconvert the baseband signal into an RF signal, and a power amplifier (PA) to amplify the RF signal, which is then radiated from the antenna(s) of the source.

The destination also can include a receive (Rx) RF chain to perform a reverse process to retrieve the original digital signal from the arriving RF signal. For example, the Rx RF chain of the destination can include a filter (e.g., low pass, high pass, band pass) to filter the RF signal received by the antenna(s) of the destination, a low noise amplifier (LNA) to amplify the filtered RF signal, a downconverter to downconvert the filtered RF signal into the baseband signal, and an analog-to-digital (ADC) converter to recover the digital signal from the baseband signal. For simplicity, "RF chain" may be shortened simply to "chain".

The process performed by the source's Tx chain to convert the digital signal onto the RF signal takes a finite amount of time, which will be generically referred to as "Tx group delay". The Tx group delay (GD) may be said to represent a delay between a measured transmission time of a signal transmitted from the source, and an actual transmission time of the signal leaving the source. The reverse process performed by the destination's Rx chain to recover the digital signal from the RF signal also takes a finite amount of time, which will be generically referred to as "Rx group delay". The Rx GD may be said to represent a delay between the actual arrival time of a signal at the destination and the measured arrival time of the signal. The measured transmission and reception times are times measured in the digital domain. The term "group delay" is used to emphasize that the delay is caused by elements in the chain as described above, which may include filters, and may result in a delay that is a function of frequency, radio access technology (RAT), carrier aggregation (CA), component carriers (CC), bandwidth parts (BWP), and so on. Although the term group-delay is used herein, it may also be simply referred to as "delay".

Regarding the RTTM signal, the transmitter 502 is the source, and the receiver 504 is the destination. In this instance, the interval (t1'–t1) represents the transmitter Tx GD, and the interval (t2–t2') represents the receiver Rx GD. Regarding the RTTR signal, the receiver 504 is the source and the transmitter 502 is the destination. Then the interval (t3'–t3) represents the receiver Tx GD, and the interval (t4–t4') represents the transmitter Rx GD.

It is thus recognized that the transmitter 502 includes both the Tx chain (associated with the transmitter Tx GD) and the Rx chain (associated with the transmitter Rx GD). For ease of reference, "transmitter total group delay" (transmitter total GD) will be used to refer to the sum of the delays due to the Tx and Rx chains of the transmitter 502.

Similarly, the receiver 504 includes both the Tx chain (associated with the receiver Tx GD) and the Rx chain (associated with the receiver Rx GD). For ease of reference, "receiver total group delay" (receiver total GD) will be used to refer to the sum of the delays due to the Tx and Rx chains of the receiver 504.

For accuracy, the actual RTT between the transmitter 502 and the receiver 504 should be determined. However, the actual times t1', t2', t3' and t4' are not directly measured. Thus, equation (2) cannot be directly applied. However, note the following:

$$t1'=t1+\text{transmitter Tx GD}, \quad (3)$$

$$t2'=t2-\text{receiver Rx GD}, \quad (4)$$

$$t3'=t3+\text{receiver Tx GD}, \quad (5)$$

$$t4'=t4-\text{transmitter Rx GD}. \quad (6)$$

This means that the actual total time and actual turn-around time may be rewritten as:

$$(t4'-t1')=(t4-t1)-\text{transmitter Tx GD}-\text{transmitter Rx GD}, \quad (7)$$

$$(t3'-t2')=(t3-t2)+\text{receiver Tx GD}+\text{receiver Rx GD}. \quad (8)$$

or $$(t2'-t3')=(t2-t3)-\text{receiver Tx GD}-\text{receiver Rx GD}. \quad (8a)$$

Then equations (2) or (2a) may be redrafted as:

$$\text{actual RTT}=(t4-t1)-(t3-t2)-\Sigma(\text{delays}), \quad (9)$$

or $$\text{actual RTT}=(t4-t1)+(t2-t3)-\Sigma(\text{delays}), \quad (9a)$$

$$\Sigma(\text{delays})=\text{transmitter total GD}+\text{receiver total GD}. \quad (10)$$

Note that the times t1, t2, t3, and t4 are determined by the transmitter 502 and the receiver 504. Then if the Tx and Rx GDs for both the transmitter 502 and the receiver 504 are known, then the actual RTT may be determined.

In an aspect, when a device (e.g., the transmitter 502, the receiver 504) includes multiple antennas, it may be able to determine or otherwise estimate its own GDs. For example, assume that a device includes first and second antennas. The device then can use a Tx chain associated with the first antenna to transmit a signal and use an Rx chain associated the second antenna to receive the same signal. The device then can measure the transmit time tt and the receive time tr. Then the total GD through both Tx and Rx chains becomes (tr−tt−ts) where ts accounts for the separation between the first and second antennas. If the separation is negligible, then the total GD can be reduced to (tr−tt). For more accurate measurements, rather than ignoring ts, it could be computed based on the device geometry or form-factor, by measuring the separation distance. Both tt and tr are in the digital domain.

Note the total delay (tr−tt) accounts for sum of the Tx and Rx GDs of the device, i.e., the total GD. This means that the transmitter 502 can determine the transmitter total GD and the receiver 504 can determine the receiver total GD. Together, the/(delays) of equation (10) may be calculated.

It is recognized that the roles of the first and second antennas in the device mentioned above can be reversed. That is, the first and second antenna may be respectively used to receive and transmit an RF signal, and the resulting total GD (which may or may not be the same as the previous total GD) may be determined. Indeed, for any pair of transmitting antenna i and receiving antenna j, i≠j, i and j=1 . . . N, N being the number of antennas, the total GD (i, j) may be determined. Translating this to the transmitter 502, the transmitter total GD (i, j) may be determined for each pair of antennas i, j of the transmitter 502. Translating this to the receiver 504, the receiver total GD (i, j) may be determined for each pair of antennas i, j of the receiver 504.

Note that each GD(i, j)=txgd(i)+rxgd(j) where txgd(i) is the group delay for the Tx chain using the i-th antenna and rxgd(j) is the group delay for the Rx chain using the j-th antenna. In other words, each device (e.g., the transmitter 502, the receiver 504) can have multiple source (transmission) and destination (reception) chains, each with corresponding Tx and Rx GDs.

Since the network node (e.g., any of the gNodeBs 402-406) can be the transmitter 502 or the receiver 504, terms "network node Tx group delay" (generically denoted by txgd(i) above, now particularized to refer to network node) and "network node Rx group delay" (generically denoted by rxgd(i) above, now particularized to refer to network node) will be used for convenience to refer to transmission and reception delays occurring at the network node. That is, the network node Tx GD indicates the time interval between a measured transmission time of a signal (e.g., measured RTTM Tx time) and the actual transmission time of the signal (e.g., actual RTTM Tx time). Also, the network node Rx GD indicates the time interval between an actual arrival time of a signal (e.g., actual RTTR Rx time) and the measured arrival time of the signal (e.g., measured RTTR Rx time). The term "network node total group delay" will be used to refer to the sum of the network node Tx and Rx GDs, i.e.:

network node total GD=network node Tx GD+network node Rx GD. (11)

In some cases, it may be possible for the network node to estimate just its Tx GD rather than the total GD of both its Tx chain and Rx chain. For example, one antenna or antenna array of the network node may transmit an RTTM signal at a first time (e.g., t1) and another antenna or antenna array of the network node may detect the RTTM signal at a second time (e.g., t1'). The network node can then subtract out the determined Tx GD from the RTT positioning procedure with the UE. In some cases, simply removing the Tx GD from the RTT results, rather than the total GD of both the Tx chain and Rx chain, may be enough to meet the accuracy requirements of the position estimate of the UE. Where the network node does determine its total GD, it could subtract the Tx GD from the total GD in order to determine the GD of the Rx chain. A UE may be able to perform similar calculations if equipped with multiple antennas.

Figure 6:
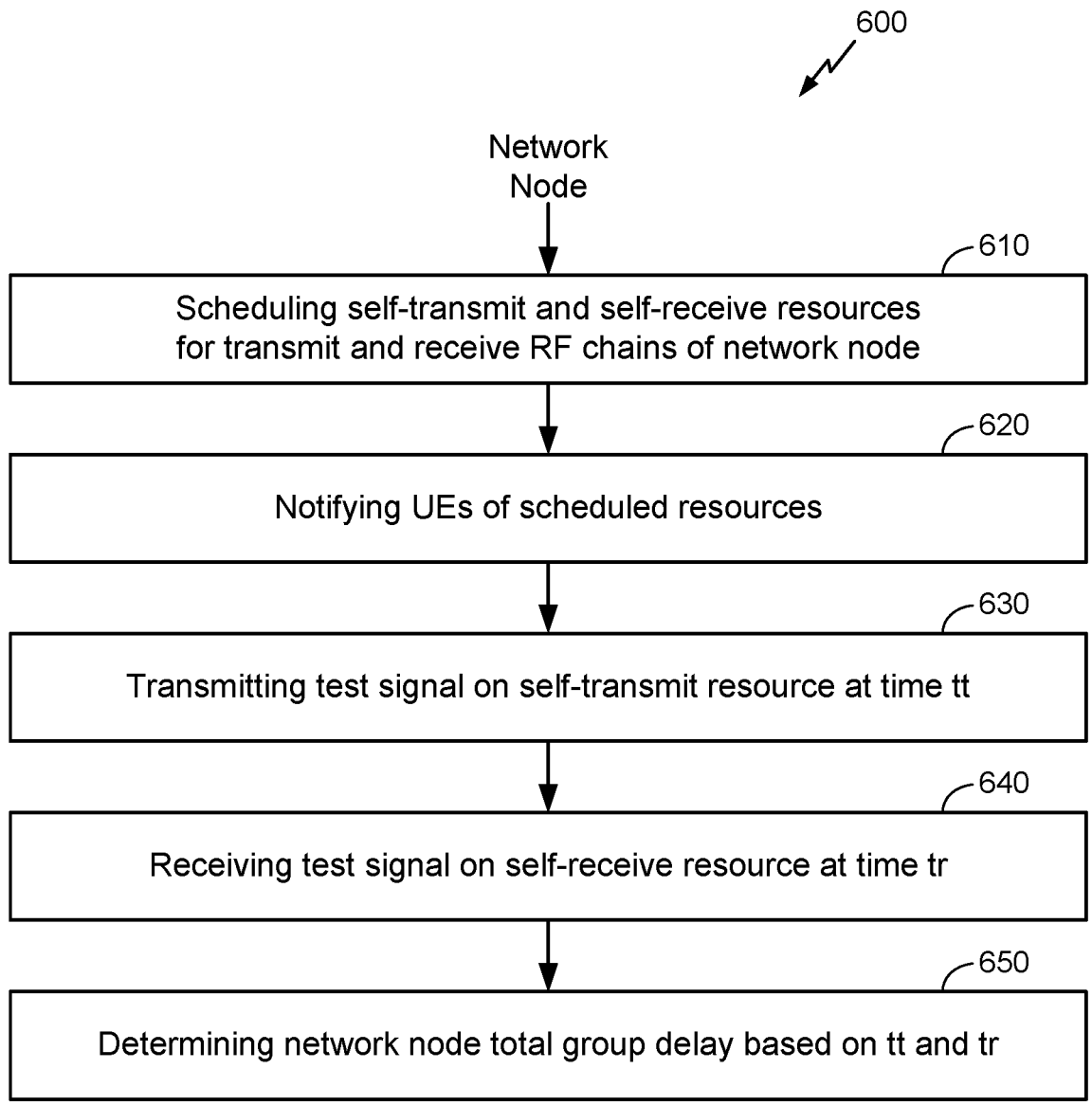
FIG. 6 illustrates an exemplary method performed by a network node to determine a network node total group delay according to an aspect of the disclosure.

FIG. 6 illustrates an example method 600 performed by the network node to determine the network node total GD. The network node may be a base station. In particular, the network node may be a serving network node, e.g., a serving base station. The method 600 may be performed by the base station apparatus 304 of FIG. 3. The memory component 340 may an example of a computer-readable medium that stores computer executable instructions for one or more of the communication device 314 (including the transmitter 316 and/or the receiver 318), the transceiver 320 (including the transmitter 322 and/or the receiver 324), the processing system 334, and/or the roundtrip time measurement component 354 of the base station apparatus 304 of FIG. 3 to perform blocks 610, 620, 630, 640, and 650 of the method 600.

At 610, the network node may schedule self-transmit and self-receive resources for network node Tx and Rx chains. The network node Tx and Rx chains may be respectively associated with transmit and receive antennas of the network node in which the transmit and receive antennas are different. In other words, the network node Tx chain may convert digital signals to RF signals for transmission through the transmit antenna, and the network node Rx chain may convert RF signals received through the receive antenna into digital signals. The self-transmit resources may comprise physical layer resources, and the self-receive resources may also comprise physical layer resources. If necessary, at 620, the network node may notify the UEs of the scheduled resources (e.g., in downlink control information (DCI)) so that the UEs will not interfere.

At 630, the network node may transmit a test signal from the transmit antenna at transmit time tt. In doing so, the test signal is converted to a test RF signal through the network node Tx chain. The transmit time tt is in the digital domain and may correspond to a frame, subframe, or a slot of the self-transmit resource in which symbols of the test signal are scheduled for transmission. The test signal may be a simulated RTTR signal.

At 640, the network node may listen on the receive antenna and detect the reception of the test signal at receive time tr. The test RF signal received on the receive antenna is converted back to the test signal through the network node Rx chain. The receive time tr is in the digital domain and may correspond to a frame, subframe, or a slot of the self-receive resource in which received symbols contained therein are recognized as the symbols of the test signal.

At 650, the network node may determine the network node total GD based on the transmit and receive times tt, tr. As indicated above with respect to FIG. 5, the transmit time tt represents a time just prior to the conversion of the digital symbols of the test signal to an RF signal (through the network node Tx chain) for transmission and the receive time tr represents a time just subsequent to the conversion of the received RF signal back to the digital symbols (through the network node Rx chain). Thus, the network node total GD, defined as a sum of the network node Tx GD and the network node Rx GD, becomes (tr−tt−ts) where ts accounts for the separation between the transmit and receive antennas. If the separation is negligible, then the network node total GD=(tr−tt).

Since the UE 104 can also be the transmitter 502 or the receiver 504, terms "UE Tx group delay" (generically denoted by txgd(i) above, now particularized to refer to UE) and "UE Rx group delay" (generically denoted by rxgd(i) above, now particularized to refer to UE) will be used for convenience to refer to transmission and reception delays occurring at the UE. That is, the UE Tx GD indicates the time interval between a measured transmission time of a signal (e.g., measured RTTR Tx time) and the actual transmission time of the signal (e.g., actual RTTR Tx time). Also, the UE Rx GD indicates the time interval between an actual arrival time of a signal (e.g., actual RTTM arrival time) and the measured arrival time of the signal (e.g., measured RTTM arrival time). The term "UE total group delay" will be used to refer to the sum of the UE Tx and Rx GDs, i.e.:

$$UE\ total\ GD = UE\ Tx\ GD + UE\ Rx\ GD. \quad (12)$$

Figure 7:
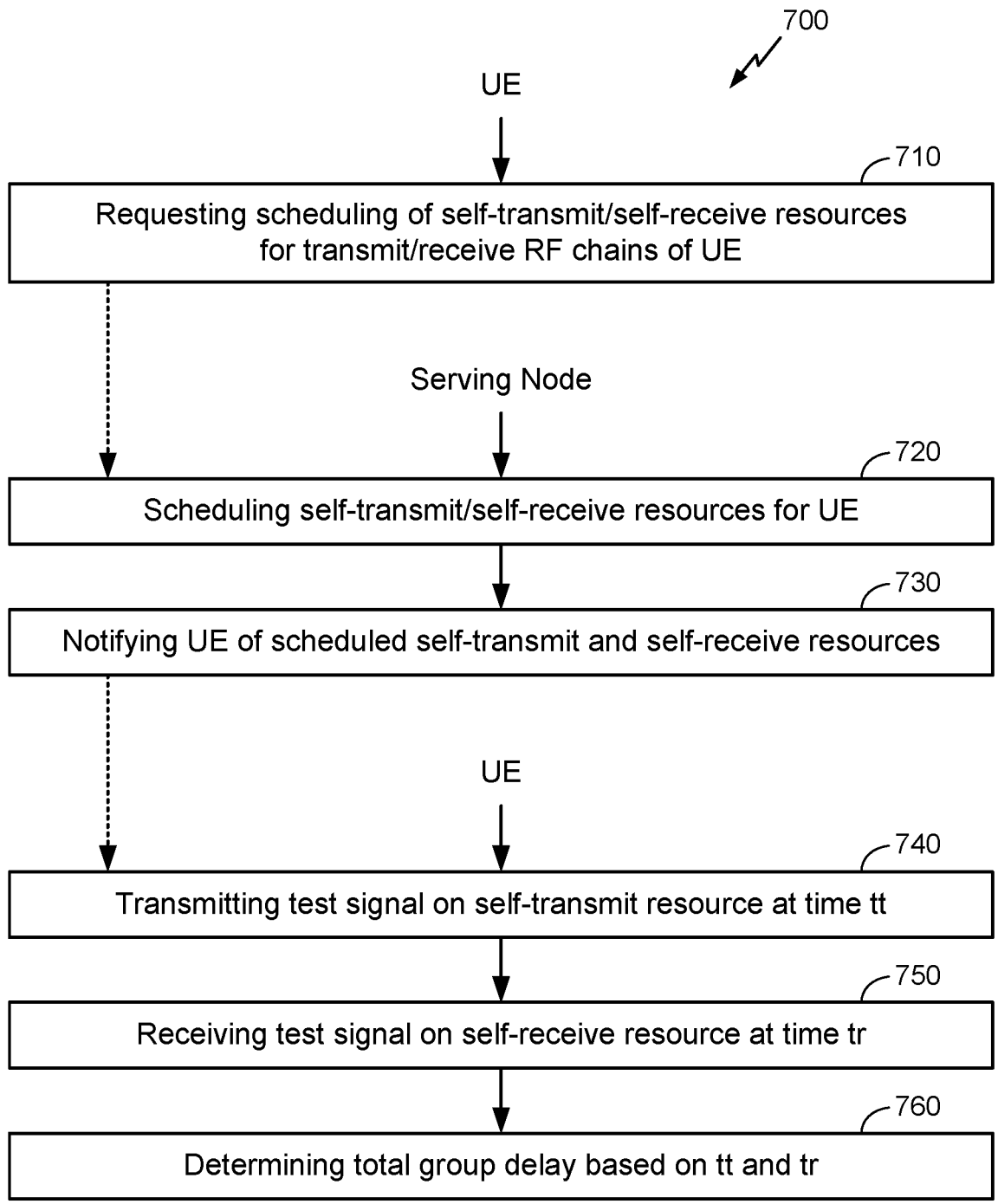
FIG. 7 illustrates an exemplary method performed by a UE to determine a UE total group delay according to an aspect of the disclosure.

FIG. 7 illustrates an example method 700 performed to determine the UE total GD. The method 700 may be performed by a UE (e.g., UE apparatus 302) in cooperation with a serving node (e.g., base station apparatus 304 of FIG. 3). The memory component 338 may an example of a computer-readable medium that stores computer executable instructions for one or more of the communication device 308 (including the transmitter 310 and/or the receiver 312), the processing system 332, and/or the roundtrip time measurement component 352 of the UE apparatus 302 of FIG. 3 to perform blocks 710, 740, 750, and 760 of the method 700. The memory component 340 may an example of a computer-readable medium that stores computer executable instructions for one or more of the communication device 314 (including the transmitter 316 and/or the receiver 318), the transceiver 320 (including the transmitter 322 and/or the receiver 324), the processing system 334, and/or the roundtrip time measurement component 354 of the base station apparatus 304 of FIG. 3 to perform blocks 720 and 730 of the method 700.

At 710, the UE may request to the network node scheduling of self-transmit and self-receive resources to be allocated for UE Tx and Rx chains. The UE Tx and Rx chains may be respectively associated with transmit and receive antennas of the UE. In other words, the UE Tx chain may convert digital signals to RF signals for transmission through the transmit antenna, and the UE RX chain may convert RF signals received through the receive antenna into digital signals.

The network node may schedule the resources at 720 and may notify the UE at 730. The network node may take into account the UE capabilities when scheduling the resources. For example, the UE may report its capabilities. The self-transmit resources may comprise physical layer resources, and the self-receive resources may also comprise physical layer resources. The resources may be scheduled such that there will be minimal interferences to the UE.

At 740, the UE may transmit a test signal from the transmit antenna at transmit time tt. In doing so, the test signal is converted to RF signal through the UE Tx chain. The transmit time tt is in the digital domain and may correspond to a frame, subframe, or a slot of the self-transmit resource in which symbols of the test signal are scheduled for transmission. The test signal may be a simulated RTTM signal.

At 750, the UE may listen on the received antenna and detect the reception of the test signal at receive time tr. The RF signal received on the receive antenna is converted back to the test signal through the UE Rx chain. The receive time tr is in the digital domain and may correspond to a frame, subframe, or a slot of the self-receive resource in which received symbols contained therein are recognized as the symbols of the test signal.

Since free antennas are needed for Rx during Tx transmission, the UE may request scheduling of resources for calibration gap with rank reduction at 710. Alternatively or in addition thereto, the network node may schedule the resources for calibration gap with rank reduction at 720. Rank reduction indicates that the maximum rank of transmissions during the gap is reduced, which ensures that UE does not have to use all its transmit antennas during the calibration gap, thus allowing some antennas to be freed up for Rx.

This can also involve reducing, limiting or altering other parameters associated with scheduled transmissions during the gap. For example, the MCS may be limited. In another example, the UE may choose a transmit beamformer that requires fewer number of antenna elements or panels, freeing up other antenna elements or panels for reception. The reduction in beamforming gain can be compensated for by increasing transmit power, either by an explicit override of the power control formula during the gap, or by existing power control mechanism in which the downlink pathloss measured increases because the same set of fewer antenna elements is also used to form the beam used as downlink pathloss reference for the power control loop.

At 760, the UE may determine the UE total GD based on the transmit and receive times tt, tr. As indicated above with respect to FIGS. 5A and 5B, the transmit time tr may represent a time just prior to the conversion of the digital symbols of the test signal to an RF signal (through the UE Tx chain) for transmission and the receive time tr may represent a time just subsequent to the conversion of the received RF signal back to the digital symbols (through the UE Rx chain). Thus, the UE total GD, defined as a sum of the UE Tx GD and the UE Rx GD, becomes (tr−tt−ts) where ts accounts for the separation between the transmit and receive antennas. If the separation is negligible, then the UE total GD can be reduced to (tr−tt).

It should be noted that not all illustrated blocks of FIGS. 6-7 need be performed, i.e., some blocks may be optional. Also, the numerical references to the blocks in these figures should not be taken as requiring that the blocks should be performed in a certain order. Indeed, some blocks may be performed concurrently.

Figure 8:
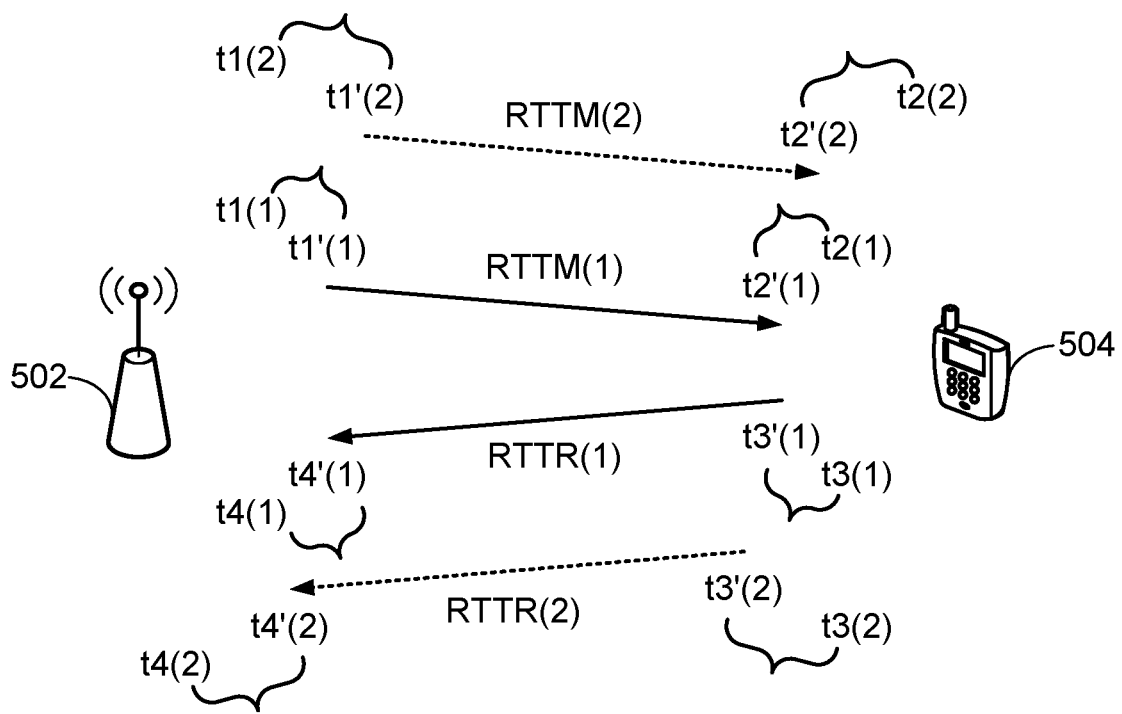
FIG. 8 illustrates another scenario for determining RTT between a transmitter and a receiver.

FIG. 8 illustrates another scenario to determine RTT between a transmitter 502 and a receiver 504. Unlike the scenario illustrated in FIG. 5A, in the scenario of FIG. 8, the transmitter 502 (e.g., network node) may send multiple RTTM signals, and the receiver 504 (e.g., UE) may respond with corresponding multiple RTTR signals. For simplicity, two RTTM signals (RTTM(1), RTTM(2)) and two RTTR signals (RTTR(1), RTTR(2)) are illustrated. But it should be noted that there can be any number of RTTM and RTTR signals.

The first and second "1" and "2" signals are assumed to be different. For example, they may be signals of different radio access technologies (RATs), signals of different frequencies, bandwidths, or component carriers (CC) in carrier aggregation (CA) scenarios, different antennas, and so on. When multiple RTTM and RTTR signals are used, this is akin to widening the bandwidth of the RTTM and RTTR waveforms. In so doing, this enables the network node and/or the UE to measure the times with increasing accuracy. This leads to better positioning accuracy and lower horizontal and/or vertical position uncertainty, which is important for centimeter-level positioning use cases.

By applying equations (9) or (9a) and (10) to both "1" and "2" signals, the actual RTTs for both signals may be determined as follows:

$$\text{actual RTT}(1)=(t4(1)-t1(1))-(t3(1)-t2(1))-\Sigma(\text{delays}(1)), \quad (13)$$

or $$\text{actual RTT}(1)=(t4(1)-t1(1))+(t2(1)-t3(1))-\Sigma(\text{delays}(1)), \quad (13a)$$

$$\Sigma(\text{delays}(1))=\text{transmitter total GD}(1)+\text{receiver total GD}(1) \quad (14)$$

$$\text{actual RTT}(2)=(t4(2)-t1(2))-(t3(2)-t2(2))-\Sigma(\text{delays}(2)), \quad (15)$$

or $$\text{actual RTT}(2)=(t4(2)-t1(2))+(t2(2)-t3(2))-\Sigma(\text{delays}(2)), \quad (15a)$$

$$\Sigma(\text{delays}(2))=\text{transmitter total GD}(2)+\text{receiver total GD}(2). \quad (16)$$

From equations (13), (13a) and (14), the actual RTT(1) can be determined from measured RTTM Tx time t1(1), measured RTTM Rx time t2(1), measured RTTR Tx time t3(1), measured RTTR Rx time t4(1), transmitter total GD(1), and receiver total GD(1). Similarly, from equations (15), (15a) and (16), the actual RTT(2) can be determined from measured RTTM Tx time t1(2), measured RTTM Rx time t2(2), measured RTTR Tx time t3(2), measured RTTR Rx time t4(2), transmitter total GD(2), and receiver total GD(2).

The measured times t1(1), t1(2), t2(1), t2(2), t3(1), t3(2), t4(1), and t4(2) may be determined from measurements of the RTTM(1), RTTR(1), RTTM(2), and RTTR(2) signals by the transmitter 502 and the receiver 504. However, the group delays—the transmitter total GD(1), the receiver total GD(1), the transmitter total GD(2), and the receiver total GD(2)—are not readily determinable through measuring the RTTM(1), RTTR(1), RTTM(2), and RTTR(2) signals. But they are necessary if equations (13) and (15) are to be used to calculate the actual RTT(1) and actual RTT(2).

Since the "1" and "2" signals are different, the Tx and Rx GDs may also differ at the transmitter 502 and/or the receiver 504. In other words, different chains may be involved in processing the "1" and "2" signals. That is to say, the "1" and "2" signals may be transmitted through different Tx chains and received through different Rx chains. Note that some or all components of the different chains may be embodied as physically different components. For example, physically different filters (e.g., different bandpass frequencies) may be used to filter the RF signal. It is also contemplated that some or all components of the different chains may be virtually distinct. For example, the same DAC converter may be used to transmit RTTM signals of different RATs.

To calculate the actual RTT(1), then:

at the transmitter 502, the Tx and Rx chains associated with transmitting the RTTM(1) signal and receiving the RTTR(1) signal should be the Tx and Rx chains associated with the transmitter total GD(1), and at the receiver 504, the Tx and Rx chains associated with transmitting the RTTR(1) signal and receiving the RTTM(1) signal should be the Tx and Rx chains associated with the receiver total GD(1).

Similarly, to calculate the actual RTT(2), then:

at the transmitter 502, the Tx and Rx chains associated with transmitting the RTTM(2) signal and receiving the RTTR(2) signal should be the Tx and Rx chains associated with the transmitter total GD(2), and at the receiver 504, the Tx and Rx chains associated with transmitting the RTTR(2) signal and receiving the RTTM(2) signal should be the Tx and Rx chains associated with the receiver total GD(2).

One way to tackle this scenario is to determine the GDs for the different combinations of signal characteristics (e.g., RAT, CA, CC, BWP, antenna, etc.). That is, one or both of the methods 600, 700 may be performed multiple times to determine the network node total GD and the UE total GD for each different combination of signal characteristics of interest. However, this may not be the most practical way. Recall from above that each GD(i, j)=txgd(i)+rxgd(j) where txgd(i) is the group delay for the Tx chain using the i-th antenna and rxgd(j) is the group delay for the Rx chain using the j-th antenna. Since there can be multiple antennas for Tx and Rx, each device (e.g., the transmitter 502, the receiver 504) can have multiple Tx and Rx chains, each with corresponding Tx and Rx GDs.

As an illustration, assume that the a device (network node/UE) includes four antennas a(0), a(1), a(3) and a(4) each of which can be used as Tx or Rx antennas. Then GDs for twelve antenna pairs (GD(0,1), GD(0,2), GD(0,3), GD(1, 0), GD(1,2), GD(1,3), GD(2,0), GD(2,1), GD(2,3), GD(3,0), GD(3,1), GD(3,2)) may be determined. Then the method 600/700 illustrated in FIG. 6/7 may be repeated twelve times.

If transmission/reception involving multiple antennas are allowed, then the number of chains, and hence, the number of GDs to be determined can increase. For example, also assume that any pair of the four antennas may be used for MIMO transmission/reception. In this instance, the method 600/700 illustrated in FIG. 6/7 may be repeated additional six times to determine GD(0/1, 2/3), GD(0/2, 1/3), (0/3, 2/3), GD(1/2, 0/3), GD(1/3, 0/2), GD(2/3, 0/1). The number of times of performing the methods 600/700 can increase as the number of antennas increase.

Antennas are not the only factors that can affect the GDs. As an example, the network node and/or the UE may be capable of operating in multiple radio access technologies (RATs). As another example, the network node and/or the UE may be capable of operating with different carrier aggregation (CA). As a further example, the network node and/or the UE may be capable of operating in multiple frequencies, component carriers (CC), and/or bandwidth parts (BWP). As yet another example, the network node and/or the UE may be capable of operating in FDD communication.

It can be seen that the number of times the methods 600, 700 are performed to determine the GDs of interest can dramatically increase as additional factors (RATs, CA, CC, BWPs, antennas, etc.) are considered. This can be take substantial amount of time and resources.

To address this issue, it is proposed to minimize the number of times the methods 600, 700 are performed while still allowing RTT determination through utilizing multiple RTTM and RTTR signals. That is, multiple combinations of Tx and Rx chains may be used for RTT determination, while minimizing the number of time the methods 600, 700 are performed.

In this proposal, the GDs for one set of Tx and Rx chains in the network node and the GDs for one set of Tx and Rx chains in the UE are determined utilizing the methods 600/700. Then the GDs for other chains in the network node and the UE are determined relative to the "calibrated" GDs. For example, assume the following:

- by applying the method of FIG. 6, the network node determines a first network node total GD associated with the first network node Tx chain and the first network node Rx chain;
- by applying the method of FIG. 7, the UE determines the first UE total GD associated with the first UE Tx chain and the first UE Rx chain;
- first RTTM and RTTR signals (e.g., RTTM(1) and RTTR (1)) utilize the same first network node Tx chain, first network node Rx chain, first UE Tx chain, and first UE Rx chain in the network node and in the UE used to determine the first network node total GD and the first UE total GD;
- second RTTM and RTTR signals (e.g., RTTM(2) and RTTR(2)) utilize second network node Tx chain, second network node Rx chain, second UE Tx chain, and second UE Rx chain in the network node and in the UE; and
- the first and second network node Tx chains are different and/or the first and second network node Rx chains are different and/or the first and second UE Tx chains are different and/or the first and second UE Rx chains are different.

When the network node sends the first and second RTTM signals and the UE responds with the first and second RTTR signals, the second actual RTT (e.g., RTT(2)) may be determined without having perform the methods 600/700 to determine the GDs associated with the second network node Tx and Rx chains and the second UE Tx and Rx chains. As detailed below, the difference in the GDs of the "1" and "2" signals may be measured, and the GD differences may be used to calculate the second actual RTT.

Assuming line-of-sight, or more generally, the same flight path between the transmitting and receiving antenna, for both "1" and "2" signals, the differences in the GDs on the downlink, i.e., the differences in the GDs for the network node Tx chain and the UE Rx chain, may be expressed as follows:

$$GDeltaDL(1, 2) = [\text{first network node } Tx\ GD + \text{first } UE\ Rx\ GD] - \quad (17)$$
$$[\text{second network node } Tx\ GD + \text{second } UE\ Rx\ GD]$$
$$= [(t1'(1) - t1(1)) + (t2(1) - t2'(1))] -$$
$$[(t1'(2) - t1(2)) + (t2(2) - t2'(2))]$$

Since the actual propagation times t2'−t1' of the first and second RTTM signals from the network node to the UE are the same if the flight paths are the same (as both signals travel at the speed of light), the differences in the measured transmission times at the network node and the measured arrival times at the UE captures the differences, i.e.:

GDdeltaDL(1,2)=−measuredTxdeltaDL(1,2)+measuredRxdeltaDL(1,2)=−(t1(1)-0(2))+(t2(1)−t2(2)). (18)

The network node may determine the measuredTxdeltaDL(1,2), and the UE may determine the measuredRxdeltaDL(1,2). In particular, these determinations may be easier if the first and the second RTTM signals belong to synchronized RATs or CCs, so that both their timings can measured using a common reference such as a chip, symbol, slot, subframe, or frame time. Note that synchronized CCs may belong to the same timing advance group (TAG) or to different TAGs. In one example, the network node may transmit both signals at the same time, i.e., t1(1)=t1(2). In this instance, the measuredTxdeltaDL(1,2) is zero and equation (18) simplifies to:

GDdeltaDL(1,2)=measuredRxdeltaDL(1,2)=(t2(1)−t2 (2)) (18a)

In other words, by merely measuring the difference in the arrival times of the DL signals in the digital domain is sufficient to determine the GDdeltaDL(1,2).

Note that in some aspects, regardless of whether or not t1(1)=t1(2), the UE may know the value of measuredTxdeltaDL, based on the scheduling of the two RTTM waveforms, which the UE may be informed of in order to know roughly (i.e., for example, to the accuracy of a slot and OFDM symbol, but not to the chip level) when to expect to receive them. In this case, the UE can measure or otherwise determine GDdeltaDL(1,2), e.g., based on equation (18).

In an aspect, the UE may report back to the network node the GDdeltaDL(1,2), e.g., as determined through equations (18) and/or (18a). In another aspect, the UE may report back to the network node the measuredRxdeltaDL(1,2), i.e., report back the difference in the digital domain arrival times (t2(1)−t2(2)). Recall that if the network node is aware of scheduling of the two RTTM waveforms, the network node can have sufficient information to determine the measuredTxdeltaDL.

Note that the procedure above has been described as measuring GDdeltaDL(1,2) using the RTTM signals RTTM (1) and RTTM(2) which are also used to measure RTT. However, this is not essential, and any other signals on the two Rx chains may be also used for this purpose. The UE may request transmissions of such signals for this purpose. These transmissions thus serve as calibration transmissions, which allow calibration of the second chain (e.g., second RAT) using the known calibration of the 1St chain (e.g., 1St RAT). The advantage of this scheme over calibration procedures 600 and 700 is that they both follow the usual DL and UL transmission and reception rules on each of the chains, without requiring the UE to receive its own transmissions.

Similarly, the differences on the GDs for the uplink, i.e., the differences in the GDs for the network node Rx chain and the UE Tx chain, may be expressed as follows:

$$GDeltaUL(1, 2) = [\text{first } UE\ Tx\ GD + \text{first network node } Rx\ GD] - \quad (19)$$
$$[\text{second } UE\ Tx\ GD + \text{second network node } Rx\ GD]$$
$$= [(t3'(1) - t3(1)) + (t4(1) - t4'(1))] -$$
$$[(t3'(2) - t3(2)) + (t4(2) - t4'(2))]$$

Again since the actual propagation times of the RTTR(1) and RTTR(2) signals from the UE to the network node are the same if the flight paths are the same, the differences in the measured transmission times at the UE and the measured arrival times at the network node captures the differences, i.e.:

$$GDeltaUL(1, 2) = -measuredTxdeltaUL(1, 2) + \text{measured } RxdeltaUL(1, 2) \quad (20)$$

$$= -(t3(1) - t3(2)) + (t4(1) - t4(2)).$$

In one example, the UE may transmit both signals at the same time, i.e., t3(1)=t3(2). In this instance, the measuredTxdeltaUL(1,2) is zero and equation (20) simplifies to:

$$GDdeltaUL(1,2)=measuredRxdeltaUL(1,2)=(t4(1)-t4(2)) \quad (20a)$$

In other words, by merely determining the difference in the arrival times of the UL signals in the digital domain is sufficient to determine the GDdeltaUL(1,2).

Note that in some aspects, regardless of whether or not t3(1)=t3(2), the network node and/or the UE may know or otherwise determine the value of measuredTxdeltaUL, based on the scheduling of the two RTTR waveforms. Alternatively or in addition thereto, the UE may report back to the network node the measuredTxdeltaUL. Once the measuredTxdeltaUL is known, the network node can measure or otherwise determine GDdeltaUL(1,2), e.g., based on equation (20).

The second actual RTT may be determined without calculating the actual GDs through methods 600 and 700. Equations (18), (18a), (20) and/or (20a) indicate that the relative GD differences GDdeltaDL(1,2) and GDdeltaUL(1, 2) may be determined entirely through the measured times t1(1), t1(2), t2(1), t2(2), t3(1), t3(2), t4(1), t4(2) in the digital domain. Having determined the relative differences GDdeltaDL(1,2) and GDdeltaUL(1,2), the/(delays(2)) of equation (16) maybe determined as follows:

$$\Sigma(delays(2))=/(delays(1))-[GDdeltaDL(1,2)+GDdeltaUL(1,2)]. \quad (21)$$

Thereafter, the second actual RTT may be calculated through equations (15) and/or (15a).

This implies that by knowing the GDs for one set of Tx and Rx chains at the network node and at the UE, the actual RTTs of signals involving other sets of Tx and Rx chains at the network and at the UE may be determined. Since the GDs for "1" signals are calibrated through applying methods 600, 700 as explained above, the calibration for the "2" signals need not be performed using the same methods 600, 700. The UE may report the measuredRxdeltaDL(1,2) to the network node together with its first UE total GD (see equation (12)) on the calibrated signal. When necessary, the UE may also report the measuredTxdeltaUL(1,2). Alternatively, the UE may directly report GDdeltaDL(1,2). The report may be provided in RRC, UL MAC-CE, or L1 report (e.g., UCI on PUCCH/PUSCH). The network node may use the report from the UE together with the network node total GD(1) (see equation (11)) on the calibrated signal to determine the total group delay on the uncalibrated signal, i.e., determine network node total GD(2)+UE total GD(2).

It should be noted that the first UE total GD—the UE total GD of the calibrated signal—need not be repeatedly reported along with the measuredRxdeltaDL(1,2) and/or the GDdeltaDL(1,2). Once the network node is aware of the first UE total GD, it may be sufficient for the UE to report only the measuredRxdeltaDL(1,2) and/or the GDdeltaDL(1,2).

In some cases, one RAT may be easier to calibrate than another, and the method described above can be used to ease the burden of calibrating the other RAT. For example, a time division duplex (TDD) RAT may be easier to calibrate than a frequency division duplex (FDD) RAT, since the methods 600, 700 require the UE to receive its own transmission. In case of FDD, this implies receiving at the uplink rather than at the downlink frequency, which may require additional hardware or modules. Thus, the UE (or network node) may use a TDD RAT to determine its GDs and then apply those GDs to an FDD RAT. In some cases, the calibration may never be performed in the FDD RAT and instead the calibration from the TDD RAT is always used for the FDD RAT.

In another example, the calibration procedure described in 600, 700 may require calibration gaps, which need to be scheduled and thus constitute a resource overhead. Thus, the procedures of 600, 700 may be used on the RAT experiencing less loading, allowing RTT procedure to be used on the more loaded RAT without having to additionally load that RAT with calibration gaps. The loading may be based on the time of day (e.g., more UEs may be communicating with the network node during the day), the amount of traffic being transmitted through the network node (e.g., there may be more streaming traffic during the evening "prime time" hours, or during business hours), or the like. The determination of when the loading will be lower (i.e., below a threshold) may be based on historical patterns. Thus, the network node (and/or the UE) may opportunistically perform the GD calibration described herein.

In an aspect, the UE or location server (or other positioning entity, such as a third-party server or third-party application on the UE) may request a certain position accuracy. Based on the requested position accuracy, the network node may determine whether or not it needs to perform a GD calibration as described herein. For example, the network node may have determined its Tx chain GD, its Rx chain GD, and/or its total GD, and each GD may be associated with some level of uncertainty. If the uncertainty is greater than the requested position accuracy, the network node can recalibrate its GD using, for example, the method illustrated in FIG. 6 or described with reference to FIG. 8. Alternatively or additionally, the network node may indicate to the UE and/or location server its current uncertainty (based on its previously calibrated GDs), and the UE and/or location server may instruct the network node to recalibrate its GD(s) based on the uncertainty being greater than a threshold (e.g., greater than the requested positioning accuracy). Alternatively or additionally, the network node (and/or the UE) may recalibrate its GD(s) opportunistically, such as when network traffic is below a threshold, the network node is serving less than a threshold number of UEs, and the like, as described above.

In an aspect, for a plurality of network nodes having the same physical characteristics, such as the same physical Rx and/or Tx chains, the same radios, the same antenna arrays, etc. (e.g., as would be the case for network nodes having the same make and model), one such network node could perform the GD calibration described herein and propagate it, either directly or indirectly (e.g., via a server, flashing, etc.), to the other network nodes. This type of GD calibration may be referred to as a "golden" calibration. If, however, for a network node that receives such a golden calibration, the positioning uncertainty using the golden calibration is greater than the required positioning accuracy, the network node can be instructed (e.g., by the UE or location server) to recalibrate using the techniques described herein to "fine tune" its own GD values. Alternatively or additionally, the network node may opportunistically recalibrate this golden calibration, such as when there is less than a threshold amount of network traffic. A UE may be similarly provisioned with a golden calibration and similarly recalibrate opportunistically or on demand.

Figure 9:
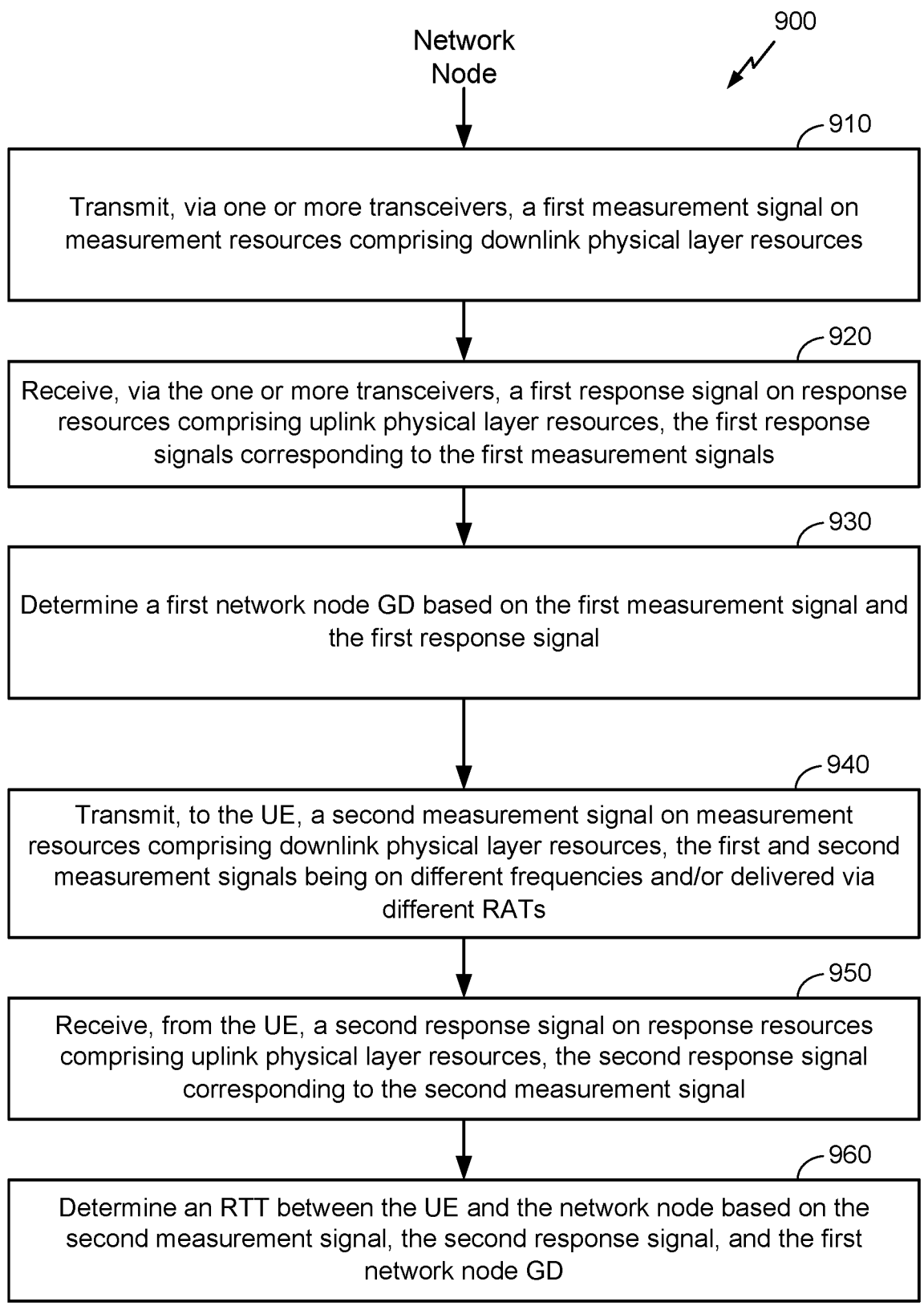
FIGS. 9 and 10 illustrate exemplary methods performed by a network node to determine RTT between the network node and a UE according to an aspect of the disclosure.

FIG. 9 illustrates an exemplary method 900 for determining an RTT of a UE (e.g., UE 104) performed by a network node. The network node may be a serving base station. The method 900 may be performed by the base station apparatus 304 of FIG. 3. The memory component 340 may an example of a computer-readable medium that stores computer executable instructions for one or more of the communication device 314 (including the transmitter 316 and/or the receiver 318), the transceiver 320 (including the transmitter 322 and/or the receiver 324), the processing system 334, and/or the roundtrip time measurement component 354 of the base station apparatus 304 of FIG. 3 to perform blocks 910-960 of the method 900.

At block 910, the network node may transmit, to itself (as a self-test signal) or a UE, a first measurement signal on measurement resources comprising downlink physical layer resources.

At block 920, the network node may receive, from itself (as a reception of the self-test signal) or the UE, a first response signal on response resources comprising uplink physical layer resources, the first response signals respectively corresponding to the first measurement signals.

At block 930, the network node may determine a first network node group delay (GD) (e.g., a Tx chain GD, a Rx chain GD, or a total GD) based on the first measurement signal and the first response signal. The first network node GD may comprise first network node Tx and/or Rx GDs involving the first network node Tx and Rx chains. Method 600 of FIG. 6 may be performed to determine the first network node total GD. The first network node Tx GD may indicate an interval between a measured transmission time of a first network node Tx signal (e.g., RTTM(1) signal) transmitted through the first network node Tx chain of the network node and an actual transmission time of the first network node Tx signal leaving the network node. That is, the first transmission interval may represent the first network node Tx GD involving the first network node Tx chain. The first network node Rx GD may indicate an interval between an actual arrival time a first network node Rx signal (e.g., RTTR(1) signal) from the UE received through the first network node Rx chain of the network node and a measured arrival time of the first network node Rx signal. That is, the first reception interval may represent the first network node Rx GD involving the first network node Rx chain.

At block 940, the network node may transmit, to the UE, a second measurement signal on measurement resources comprising downlink physical layer resources. The first and second measurement signals may be on different frequencies and/or delivered via different radio access technologies (RATs). In general, the first and second measurements signals being different may be explained as follows. Assume that the first measurement signal is processed through the first network node Tx chain at the network node for transmission and is process through the first UE Rx chain at the UE. Also assume that the second measurement signal is processed through a second network node Tx chain at the network node for transmission and is process through a second UE Rx chain at the UE. The first and second measurement signals may be deemed to be different when the first and second network node Tx chains are different and/or the first and second UE Rx chains are different.

The first RTTM signal (e.g., RTTM(1)) may be transmitted through the same network node Tx chain of the network node used in part to determine the first network node total GD in the method 600, and may be received through the same UE Rx chain of the UE used in part to determine the first UE total GD in the method 700. The second RTTM signal (e.g., RTTM(2)) may be different from the first RTTM signal in that the second RTTM signal may be transmitted through a different network node Tx chain of the network node and/or may be received through a different UE Rx chain in the UE. For example, the first and second RTTM signals may differ in any combination of RATs, CAs, CCs, MCSs, BWPs, etc.

The first RTTM signal may comprise a first RTTM waveform, which enables the UE to detect/measure the first RTTM signal. The network node may measure the transmission of the first RTTM waveform at time t1(1), which is the first measured RTTM Tx time in the digital domain. The first measured RTTM Tx time may correspond to the frame, subframe, or a slot of the RTTM resource scheduled/allocated for the symbols of the first RTTM signal, and may represent a time just prior to the symbols of the first RTTM signal being converted to the first RTTM waveform for transmission.

The second RTTM signal may comprise a second RTTM waveform, which enables the UE to detect/measure the second RTTM signal. The network node may measure the transmission of the second RTTM waveform at time t1(2), which is the second measured RTTM Tx time in the digital domain. The second measured RTTM Tx time may correspond to the frame, subframe, or a slot of the RTTM resource scheduled/allocated for the symbols of the second RTTM signal, and may represent a time just prior to the symbols of the second RTTM signal being converted to the second RTTM waveform for transmission. The first and second measured RTTM Tx times may be independent of each other.

At block 950, the network node may receive, from the UE, a second response signal on response resources comprising uplink physical layer resources. The first and second response signals (e.g., RTTM(1), RTTM(2)) may respectively correspond to the first and second measurement signals (e.g., RTTR(1), RTTR(2)). The first RTTR signal (e.g., RTTR(1)) may be received through the same network node Rx chain of the network node used in part to determine the first network node total GD in the method 600, and may be transmitted through the same UE Tx chain in the UE used in part to determine the first UE total GD in the method 700. The second RTTR signal (e.g., RTTR(2)) may be different from the first RTTR signal in that the second RTTR signal may be received through a different network node Rx chain of the network node and/or may be transmitted through a different UE Tx chain in the UE. For example, the first and second RTTR signals may differ in any combination of RATs, CCs, MCSs, BWPs, etc.

The first RTTR signal may correspond to one or more of the transmitted RTTM signals including the first RTTM signal and may comprise a first RTTR waveform and a first RTTR payload. The first RTTR waveform enables the network node to detect/measure the first RTTR signal. The network node may measure the reception of the first RTTR waveform at time t4(1), which is the first measured RTTR Rx time in the digital domain. The first measured RTTR Rx time may correspond to the frame, subframe, or a slot of the scheduled/allocated RTTR resource in which the symbols contained therein are the symbols of the first RTTR signal. The first measured RTTR Rx time may represent a time just subsequent to the first RTTR waveform being converted to symbols of the first RTTR signal.

The second RTTR signal may correspond to one or more of the transmitted RTTM signals including the second RTTM signal and may comprise a second RTTR waveform and a second RTTR payload. The second RTTR waveform enables the network node to detect/measure the second RTTR signal. The network node may measure the reception of the second RTTR waveform at time t4(2), which is the second measured RTTR Rx time in the digital domain. The second measured RTTR Rx time may correspond to the frame, subframe, or a slot of the scheduled/allocated RTTR resource in which the symbols contained therein are the symbols of the second RTTR signal. The second measured RTTR Rx time may represent a time just subsequent to the second RTTR waveform being converted to symbols of the second RTTR signal.

At block 960, the network node may determine the first RTT between the UE and the network node based on the second measurement signal (e.g., RTTM(1)), the second response signal (e.g., RTTR(1)), and the first network GD. At this juncture, the network node may be aware of the measured times t1(1) and t4(1). Therefore, the network node can determine the first measured total time (t4(1)−t1(1)). The network node is also aware of the first network node total GD determined through the method 600.

The first RTTR payload may comprise any combination of first UE total GD (e.g., determined through method 700), a first measured RTTM Rx time (t2(1)), a first measured RTTR Tx time (t3(1)), and a first measured UE turn-around time (t3(1)−t2(1)), and a first actual UE turn-around time (t3'(1)−t2'(1)). As a result, the network node may calculate the first actual RTT in accordance with equations (13), (13a) and/or (14) or variations thereof. For example, if the UE report includes the first UE total GD and the first measured UE turn-around time, the network node may calculate the first actual RTT as follows:

$$\text{first actual RTT} = (t4(1)-t1(1))-(t3(1)-t2(1))-\Sigma(\text{delays}(1)), \quad (22)$$

or $$\text{first actual RTT} = (t4(1)-t1(1))+(t2(1)-t3(1))-\Sigma(\text{delays}(1)), \quad (22a)$$

/(delays(1))=first network node total GD+first UE total GD (23) As another example, if the UE report includes the first actual UE turn-around time (which is obtained by including the first UE total GD with the first measured UE turn-around time), the network node may calculate the first actual RTT as follows:

$$\text{first actual RTT} = (t4(1)-t1(1))-(t3'(1)-t2'(1))-\text{first network node total GD} \quad (24)$$

The network node may determine the second RTT between the UE and the network node based on the second measurement signal (e.g., RTTM(2)), the second response signal (e.g., RTTR(2)), and the first network node total GD. At this juncture, the network node may also be aware of the measured times t1(2) and t4(2). Therefore, the network node can determine the first measured total time (t4(1)−t1(1)). The second RTTR payload may comprise any combination of the first UE total GD, second measured RTTM Rx time (t2(2)), second measured RTTR Tx time (t3(2)), second measured UE turn-around time (t3(2)−t2(2)), measuredRxdeltaDL(1,2) (t2(2)−t2(1)), measuredTxdeltaUL(1,2) (t3(2)−t3(1)), and GDdeltaDL(1,2) (e.g., see equations (18) and/or (18a)). Further, the network node may determine any combination of measured TxdeltaDL(1,2) (t1(1)−t1(2)), measuredRxdeltaUL(1,2) (t4(1)−t4(2)), and GDdeltaUL(1, 2) (e.g., see equations (20) and/or (20a)).

Based on equation (18), the network node may be provided from the UE and/or calculate the GDdeltaDL(1,2) differences as follows:

$$GDeltaDL(1, 2) = -measuredTxdeltaDL(1, 2) + \quad (25)$$
$$measuredRxdeltaDL(1, 2)$$
$$= -(t1(1) - t1(2)) + (t2(1) - t2(2)).$$

Based on equation (20), the network node may calculate the GDdeltaUL(1,2) as follows:

$$GDeltaUL(1, 2) = -measuredTxdeltaUL(1, 2) + \quad (26)$$
$$measured\ RxdeltaUL(1, 2)$$
$$= -(t3(1) - t3(2)) + (t4(1) - t4(2)).$$

Note that if the network node transmits the first and second RTTM signals at the same digital time, i.e., t1(1)=t1 (2), then GDdeltaDL(1,2) simplifies to:

$$GDdeltaDL(1,2)=measuredRxdeltaDL(1,2)=t2(1)-t2(2). \quad (25a)$$

Also, if the UE transmits the first and second RTTR signals at the same digital time, i.e., t3(1)=t3(2), then then GDdeltaUL(1,2) simplifies to:

$$GDdeltaUL(1,2)=measuredRxdeltaUL(1,2)=t4(1)-t4(2). \quad (26a)$$

The second actual RTT may then be calculated in accordance with equations (15), (15a), and/or (16) or variations thereof. For example, if the UE report includes the GDdeltaDL(1,2), then the second actual RTT may be calculated as follows:

$$\text{second actual RTT}=\text{first actual RTT}+GDdeltaDL(1,2)+GDdeltaUL(1,2). \quad (27)$$

If first and second RTTM signals are transmitted at the same time and the first and second RTTR signals are transmitted, then the second actual RTT may be simplified as follows:

$$\text{second actual RTT}=\text{first actual RTT}+measuredRxdeltaDL(1,2)+measuredRxdeltaUL(1,2). \quad (27a)$$

That is, the methods 600, 700 need not be performed to determine the second actual RTT. Alternatively, if the UE report includes the second measured RTTM Tx and Rx times and/or the second measured UE turn-around time, the network node may calculate the second actual RTT as follows:

$$\text{second actual RTT}=(t4(2)-t1(2))-(t3(2)-t2(2))-\Sigma(\text{delays}(2)), \quad (28)$$

$$\Sigma(\text{delays}(2))=/(\text{delays}(1))+GDdeltaDL(1,2)+GDdeltaUL(1,2). \quad (29)$$

Again, methods 600, 700 are not necessary to determine second actual RTT once the first actual RTT (calibrated RTT) is determined.

Figure 10:
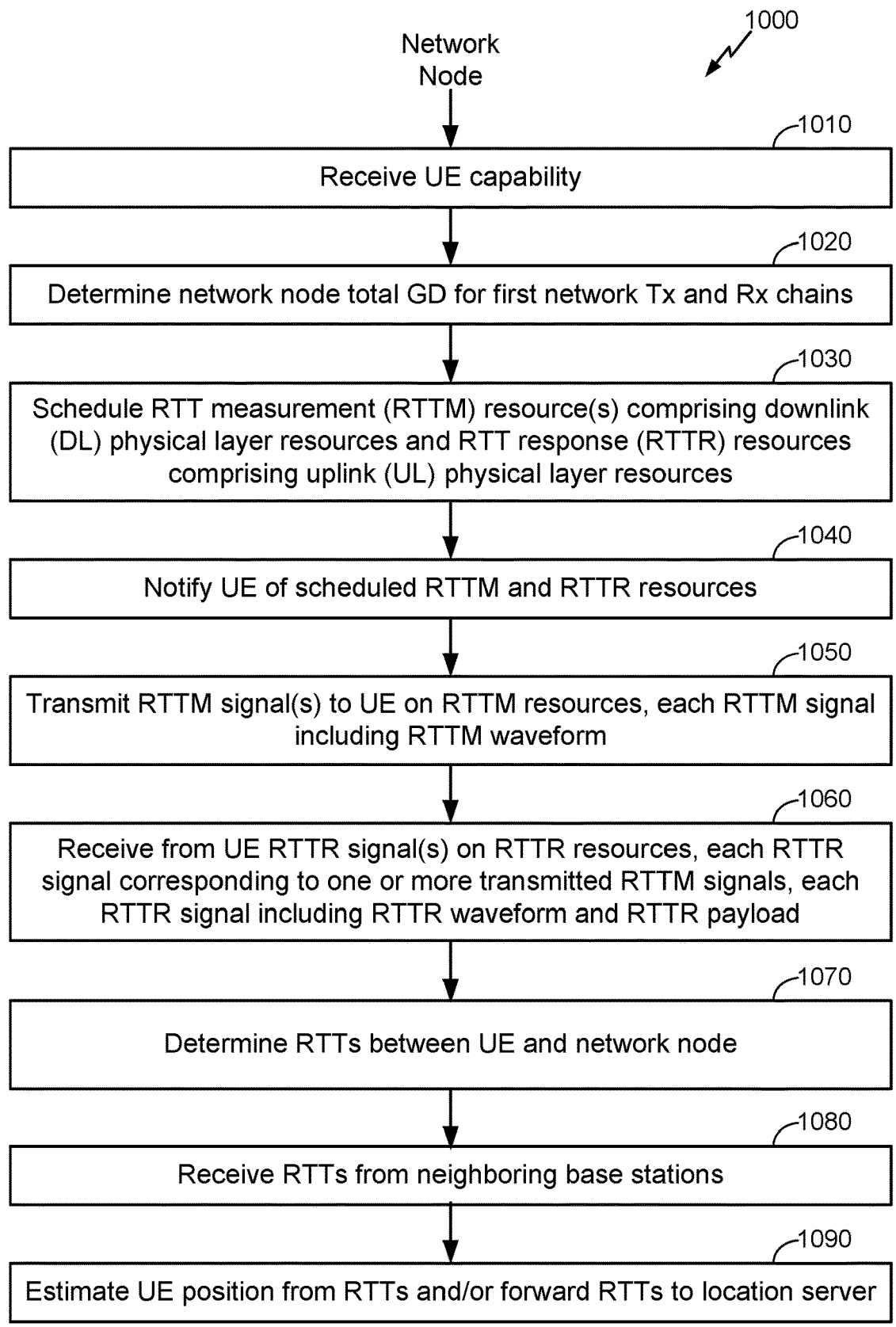

FIG. 10 illustrates an exemplary method 1000, which may be a particular implementation of the method 900, performed by a network node for determining an RTT of a UE. The network node may be a serving base station. The method 1000 may be performed by the base station apparatus 304 of FIG. 3. The memory component 340 may an example of a computer-readable medium that stores computer executable instructions for one or more of the communication device 314 (including the transmitter 316 and/or the receiver 318), the transceiver 320 (including the transmitter 322 and/or the receiver 324), the processing system 334, and/or the roundtrip time measurement component 354 of the base station apparatus 304 of FIG. 3 to perform blocks 1010-1090 of the method 1000.

At block 1010, the network node may receive a report from the UE of its capabilities (e.g., RATs, CAs, CCs, BWPs, antennas, MIMO capacity, FDD capability, and so on).

At block 1020, the network node may determine a first network node total GD, which comprises first network node Tx and Rx GDs involving first network node Tx and Rx chains. This may correspond to block 910 of FIG. 9. Therefore, detailed description of block 1020 will be omitted.

At block 1030, the network node may schedule RTTM resources for transmitting first and second RTTM signals (e.g., RTTM(1), RTTM(2)) to the UE. The network node may also schedule RTTR resources for receiving first and second RTTR signals (e.g., RTTR(1), RTTR(2)) from the UE. It should be noted that network node may schedule a plurality of RTTM and a plurality of RTTR resources. But for ease of description, focus of the discussion will be on first and second RTTM signals and first and second RTTR signals.

The RTTM resources may comprise downlink (DL) physical layer resources. For example, CSIRS, PRS, TRS, and/or SSB) may be configured for use as the RTTM waveform. The RTTR resources may comprise uplink (UL) physical layer resources. For example, uplink SRS may be configured for use as the RTTR waveform. As another example, PUCCH and/or PUSCH resources may be allocated to carry the RTTR payload. The PUCCH/PUSCH may be sized based on the payload.

At block 1040, the network node may notify the UE, e.g., by sending a control signal, of the scheduled RTTM resources so that the UE can properly listen for the RTTM waveforms. The control signal may also notify the UE of the scheduled RTTR resources so that the UE can transmit the RTTR waveforms and the RTTR payload on the proper resources.

At block 1050, the network node may transmit the first and second RTTM signals to the UE on the RTTM resources. This may correspond to block 920 of FIG. 9. Therefore, detailed description of block 1050 will be omitted.

At block 1060, the network node may receive the first and second RTTR signals from the UE on the RTTR resources. This may correspond to block 930 of FIG. 9. Therefore, detailed description of block 1060 will be omitted.

At block 1070, the network node may determine the first and second RTTs between the UE and the network node. This may correspond to blocks 940 and 950 of FIG. 9. Therefore, detailed description of block 1070 will be omitted.

The network node may determine a composite RTT between the network node and the UE based on the first and second actual RTTs. For example, the network node may take as the composite RTT the smaller of the first and second actual RTT. As another example, the network node may take as the composite RTT the average of the first and second actual RTT.

When RTTs are determined between the UE and a plurality of base stations (e.g., gNodeBs 402-406), the position of the UE can be estimated. To accommodate, the notification provided at block 1040 may notify the UE of the plurality of base stations that will be transmitting corresponding plurality of RTTM signals to the UE and receiving the plurality of RTTR signals from the UE. The plurality of base stations may be neighboring base stations within communication range of the UE.

To determine the position of the UE, at block 1080, the network node may receive (e.g., through the X2 interface) a plurality of RTTs from the plurality of base stations, where each base station has calculated the RTT between that base station and the UE. At block 1090, the network node may estimate the UE's position based on the plurality of RTTs as well as the RTT between the network node and the UE. Alternatively or in addition thereto, the network node may forward the RTTs to a location server to estimate the UE's position.

Figure 11:
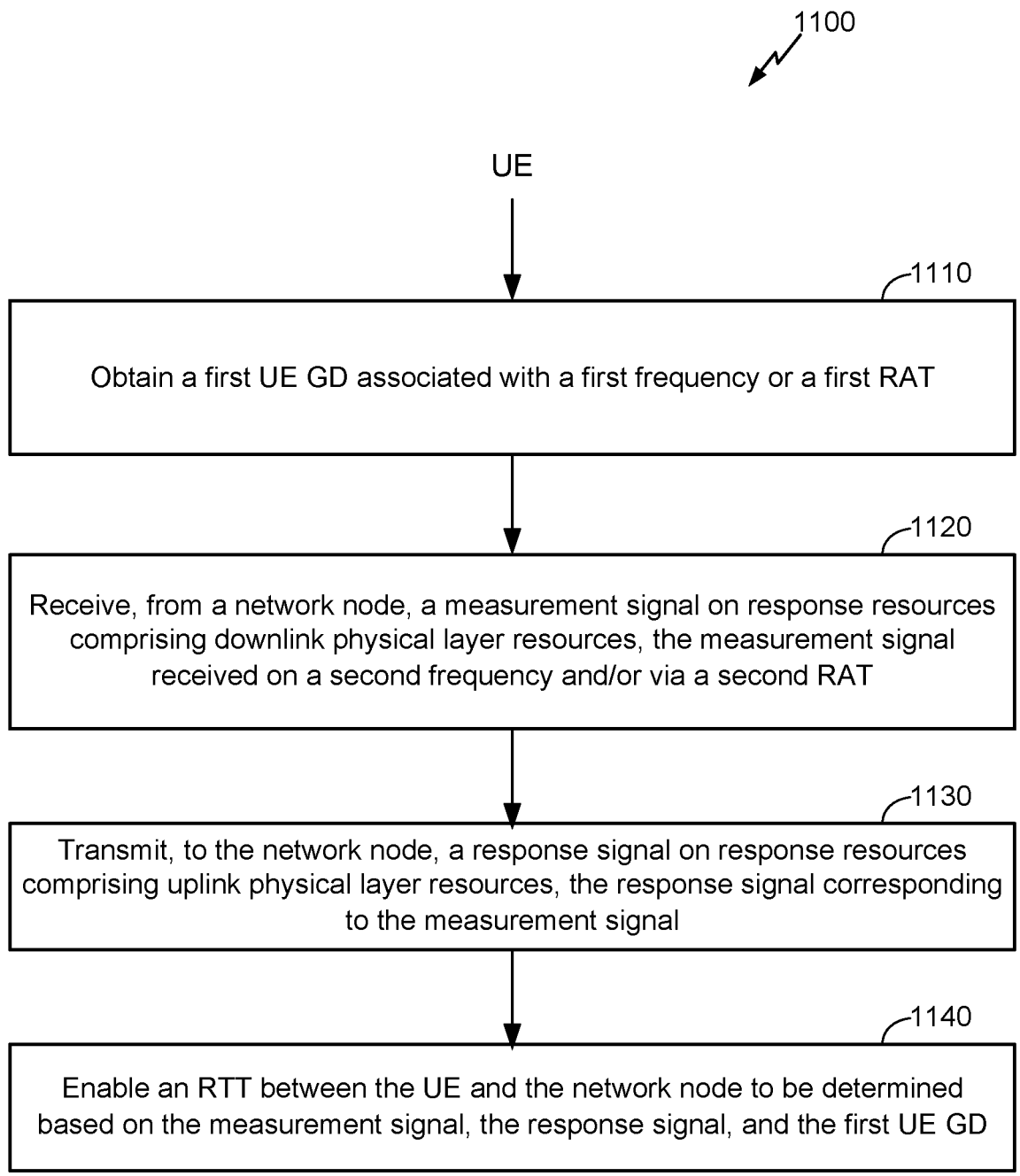
FIGS. 11 and 12 illustrate exemplary methods performed by a UE to determine RTT between a network node and the UE according to an aspect of the disclosure.

FIG. 11 illustrates an exemplary method 1100 performed by the UE. The method 1100 may be performed by the UE apparatus 302 of FIG. 3. The memory component 338 may an example of a computer-readable medium that stores computer executable instructions for one or more of the communication device 308 (including the transmitter 310 and/or the receiver 312), the processing system 332, and/or the roundtrip time measurement component 352 of the UE apparatus 304 of FIG. 3 to perform blocks 1110-1140 of the method 1100.

At block 1110, the UE may obtain a first UE GD (e.g., a Tx chain GD, a Rx chain GD, or a total GD) associated with a first frequency or a first RAT. For example, the UE may perform method 700 of FIG. 7 to determine the first UE total GD. For example, the UE may transmit, to itself (as a self-test signal), a first response signal on response resources comprising uplink physical layer resources, and receive, from itself (as a reception of the self-test signal), a first measurement signal on measurement resources comprising downlink physical layer resources. Alternatively, if equipped with multiple antennas, it may be possible for the UE to estimate just its Tx GD rather than the total GD of both its Tx chain and Rx chain. For example, one antenna of the UE may transmit a signal (e.g., an RTTM or RTTR signal) at a first time (e.g., t3) and another antenna of the UE may detect the signal at a second time (e.g., t3'). The UE can then subtract out the determined Tx GD from an RTT positioning procedure with a network node. Where the UE also determines its total GD, it could subtract the Tx GD from the total GD in order to determine the GD of the Rx chain. As another alternative, the UE may send the resulting measurements of the method of FIG. 7 to the network node or a location server so that the network node or location server calculates the UE's total GD and returns it to the UE. A first UE Tx GD may indicate an interval between a measured transmission time of a first UE Tx signal (e.g., RTTR(1) signal) transmitted through the first UE Tx chain of the UE and an actual transmission time of the first UE Tx signal leaving the UE. That is, the interval may represent the first UE Tx GD involving the first UE Tx chain. A first UE Rx GD may indicate an interval between an actual arrival time of a first UE Rx signal (e.g., RTTM(1) signal) received through the first UE Rx chain of the UE and a measured arrival time of the first UE Rx signal. That is, the interval may represent the first UE Rx GD involving the first UE Rx chain.

At block 1120, the UE may receive a (second) measurement signal (e.g., RTTM(2) signal) on response resources comprising downlink physical layer resources (e.g., RTTM resources) from the network node. The measurement signal may be received on a second frequency and/or via a second RAT. The first measurement signal may be received through the first UE Rx chain of the UE and the second measurement signal may be received through a second UE Rx chain of the UE.

The UE may measure the reception of the first RTTM waveform at time t2(1), which is the first measured RTTM Rx time in the digital domain. The first measured RTTM Rx time may correspond to the frame, subframe, or a slot of the scheduled/allocated RTTM resource in which the symbols contained therein are the symbols of the first RTTM signal. The first measured RTTM Rx time may represent a time just subsequent to the first RTTM waveform being converted to symbols of the first RTTM signal.

The UE may also measure the reception of the second RTTM waveform at time t2(2), which is the second measured RTTM Rx time in the digital domain. The second measured RTTM Rx time may correspond to the frame, subframe, or a slot of the scheduled/allocated RTTM resource in which the symbols contained therein are the symbols of the second RTTM signal. The second measured RTTM Rx time may represent a time just subsequent to the second RTTM waveform being converted to symbols of the second RTTM signal. The first and second measured RTTM Rx times may be independent of each other.

At block 1130, the UE may transmit, to the network node via the one or more transceivers, a (second) response signal on response resources comprising uplink physical layer resources, the response signal corresponding to the measurement signal.

At block 1140, the UE may enable an RTT between the UE and the network node to be determined based on the measurement signal, the response signal, and the first UE GD. For example, the UE may calculate the RTT based on the measurement signal, the response signal, and the first UE GD. Alternatively, the UE may transmit the first UE GD to a location server or other positioning entity to enable it to calculate the RTT.

Figure 12:
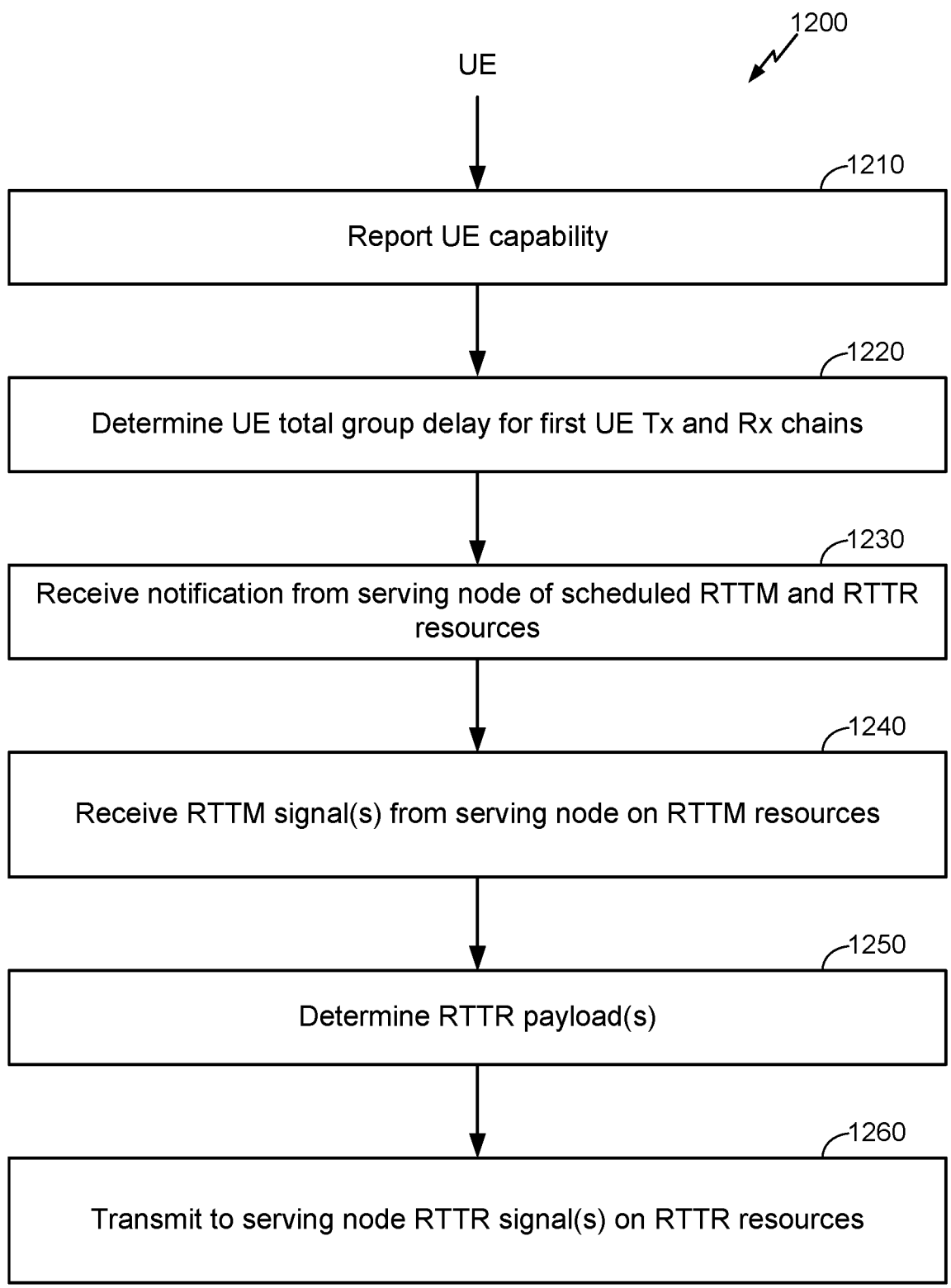

FIG. 12 illustrates an exemplary method 1200, which may be a particular implementation of the method 1100, performed by the UE. The method 1200 may be performed by the UE apparatus 302 of FIG. 3. The memory component 338 may an example of a computer-readable medium that stores computer executable instructions for one or more of the communication device 308 (including the transmitter 310 and/or the receiver 312), the processing system 332, and/or the roundtrip time measurement component 352 of the UE apparatus 302 of FIG. 3 to perform blocks 1210-1240 of the method 1200.

At block 1210, the UE may provide a UE capability report to the network node. For example, the UE may report its capabilities (e.g., RATs, CAs, CCs, BWPs, antennas, MIMO capacity, FDD capability, and so on).

At block 1220, the UE may determine a first UE total GD, which comprises first UE Tx and Rx GDs involving first UE Tx and Rx chains. This may correspond to block 1110 of FIG. 11. Therefore, detailed description of block 1050 will be omitted.

At block 1230, the UE may receive notification from the network node, e.g., through a control signal, of the scheduled RTTM and RTTR resources. At block 1240, the UE may receive the first and second RTTM signals on the RTTM resources from the network. This may correspond to block 1120 of FIG. 11. Therefore, detailed description of block 1050 will be omitted.

At block 1250, the UE may determine the first and second RTTR payloads of the first and second RTTR signals. This may correspond to block 1130 of FIG. 11. Therefore, detailed description of block 1050 will be omitted.

At block 1260, the UE may transmit the first and second RTTR signals to the network node on the RTTR resources. This may correspond to block 1140 of FIG. 11. Therefore, detailed description of block 1050 will be omitted.

While only first and second signals (RTTM(1), RTTM(2), RTTR(1), RTTR(2)) are mentioned, the methods 900, 1000, 1100, and 1200 can be generalized to accommodate any number of signals. In an aspect, the specific signals (e.g., PRS) may be transmitted at blocks 920, 1050 from the network node to allow calculations of the GDdeltaDL and GDdeltaUL at blocks 950, 1070. While not shown, the UE may request such transmissions if it suspects one or both of the first and second RTTM signals were received on an NLOS path. For example, if the measuredRxdeltaDL(1,2) |(t2(2)−t2(1))| of a previous transmission is greater than a thresholdRxdeltaDL (which may predetermined or dynamically set), the UE may request a repeat transmission of first and/or second RTTM signals, e.g., on a different beam. In another aspect, the roles of the first and second "1" and "2" signals may be changed. That is, the calibration may be on the "2" signals. This can happen if calibration gaps become available for the "2" signals.

It should be noted that not all illustrated blocks of FIGS. 6-7 and 9-12 need be performed, i.e., some blocks may be optional. Also, the numerical references to the blocks in these figures should not be taken as requiring that the blocks should be performed in a certain order. Indeed, some blocks may be performed concurrently.

In an aspect, while a network node (e.g., a gNodeB) may calculate its total GD and possibly the total GD of a UE, and a UE may calculate its own total GD, in some cases, a location server (e.g., location server 230, LMF 270) may perform the calculation for total group delay for one or both of the network node and the UE. Specifically, the network node and/or the UE can report the measurements described above (e.g., transmission times (e.g., time tt), reception times (e.g., time tr), RTT times, etc.) to the location server, and the location server, rather than the network node and/or UE, can calculate the respective total GDs for the network node and/or UE. The location server may also use the first total GDs for one frequency and/or RAT to calculate total GDs for a second frequency and/or RAT, as described above. The location server can then use these total GDs to calculate the RTT between the UE and the base station, as described above.

Figure 13:
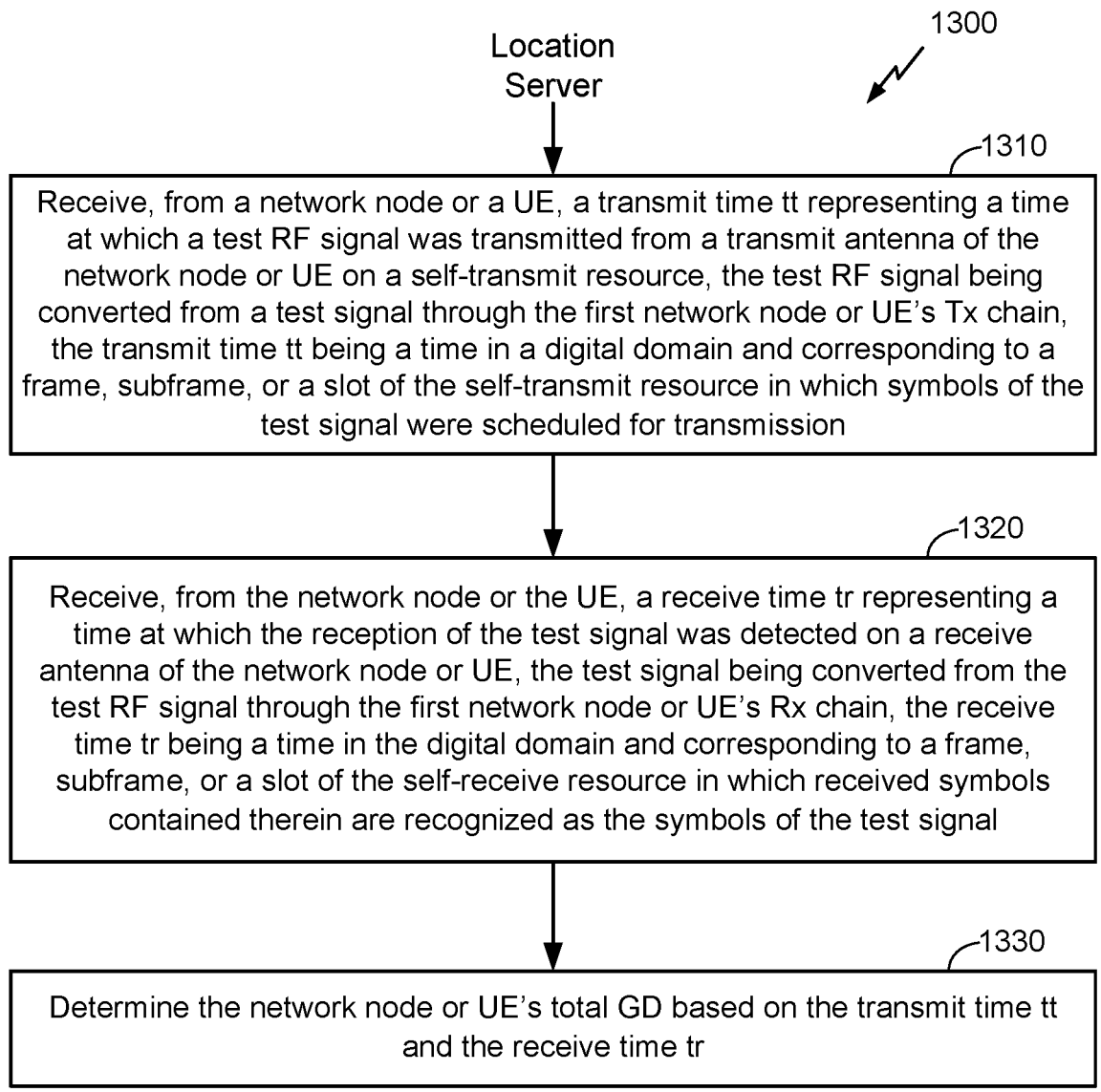
FIG. 13 is a method of operating a location server, according to aspects of the disclosure.

FIG. 13 illustrates an exemplary method 1300 of operating a location server, according to aspects of the disclosure. The location server may perform the method 1300 for a network node and/or a UE involved in a positioning session, such as an RTT positioning session. For example, the location server can perform the method 1300 for the UE, and separately perform the method 1300 for the network node. In an aspect, the method 1300 may be performed by the apparatus 306 of FIG. 3. The memory component 342 may an example of a computer-readable medium that stores computer executable instructions for one or more of the communication device 326 (including the transmitter 328 and/or the receiver 330), the processing system 336, and/or the roundtrip time measurement component 356 of the apparatus 306 of FIG. 3 to perform blocks 1310-1330 of the method 1300.

At block 1310, the location server may receive, from a network node or a UE, a transmit time tt representing a time at which a test RF signal was transmitted from a transmit antenna of the network node or UE on a self-transmit resource, the test RF signal being converted from a test signal through the first network node or UE's Tx chain, the transmit time tt being a time in a digital domain and corresponding to a frame, subframe, or a slot of the self-transmit resource in which symbols of the test signal were scheduled for transmission.

At block 1320, the location server may receive, from the network node or the UE, a receive time tr representing a time at which the reception of the test signal was detected on a receive antenna of the network node or UE, the test signal being converted from the test RF signal through the first network node or UE's Rx chain, the receive time tr being a time in the digital domain and corresponding to a frame, subframe, or a slot of the self-receive resource in which received symbols contained therein are recognized as the symbols of the test signal.

At block 1330, the location server may determine the network node or UE's total GD based on the transmit time tt and the receive time tr, as described above. The location server may then use the total GD to compute the RTT between the network node and the UE, or may send the total GD to the network node and/or the UE to enable one or both of them to compute the RTT.

Figure 14:
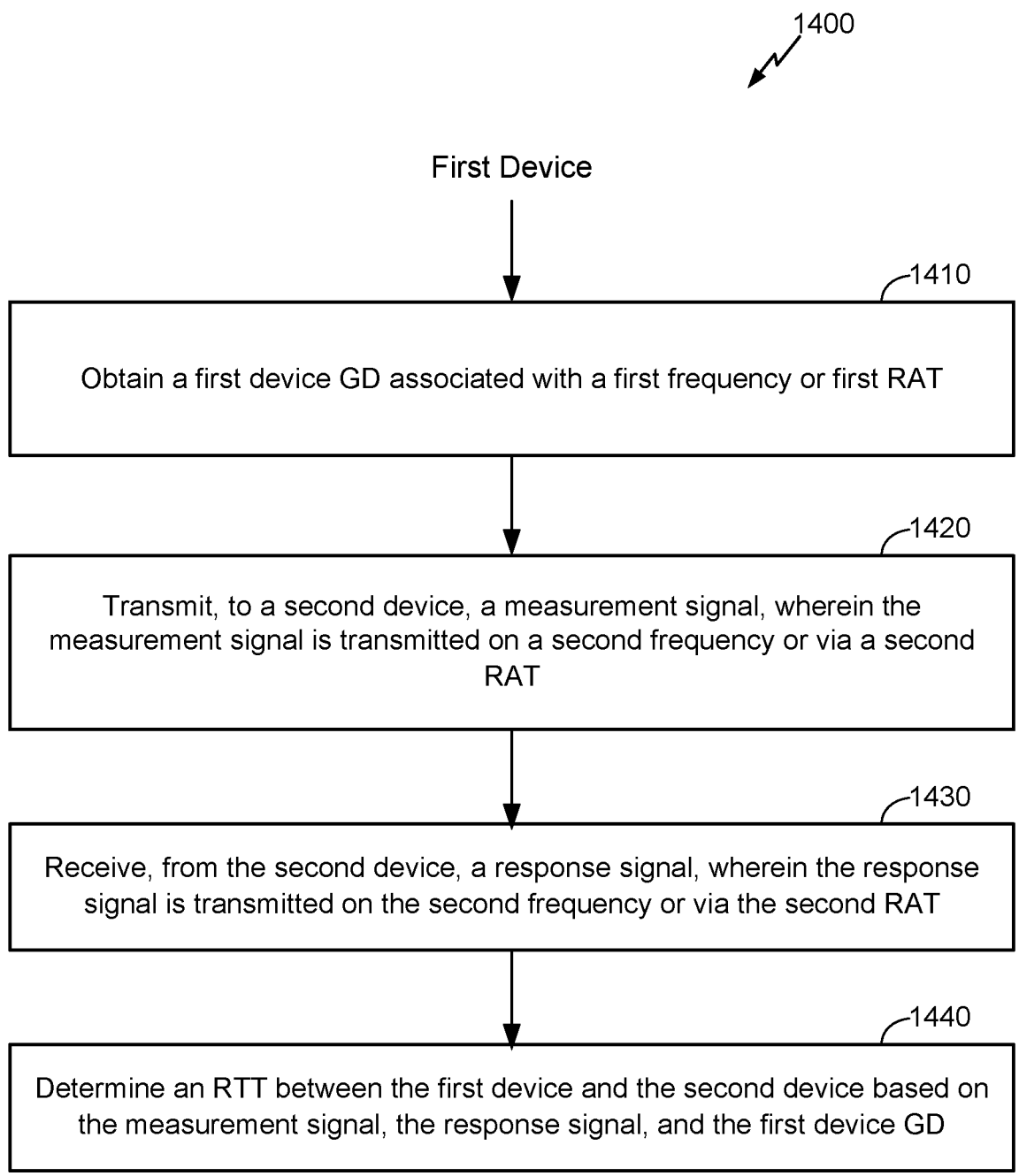
FIG. 14 is a method of operating a first device, according to aspects of the disclosure.

FIG. 14 illustrates an exemplary method 1400 of operating a first device, according to aspects of the disclosure. The first device may be a UE or a network node. Where the first device is a UE, the method 1400 may be performed by the UE apparatus 302 of FIG. 3. The memory component 338 may an example of a computer-readable medium that stores computer executable instructions for one or more of the communication device 308 (including the transmitter 310 and/or the receiver 312), the processing system 332, and/or the roundtrip time measurement component 352 of the UE apparatus 304 of FIG. 3 to perform blocks 1410-1440 of the method 1100. Where the first device is a network node, the method 1400 may be performed by the base station apparatus 304 of FIG. 3. The memory component 340 may an example of a computer-readable medium that stores computer executable instructions for one or more of the communication device 314 (including the transmitter 316 and/or the receiver 318), the transceiver 320 (including the transmitter 322 and/or the receiver 324), the processing system 334, and/or the roundtrip time measurement component 354 of the base station apparatus 304 of FIG. 3 to perform blocks 1410-1440 of the method 1400.

At 1410, the first device obtains a first device GD (e.g., a Tx chain GD, a Rx chain GD, or a total GD) associated with a first frequency or first RAT (e.g., a TDD RAT). The first device may obtain the first device GD using the methods illustrated in FIGS. 6 and/or 7, using another antenna to measure a transmitted signal (e.g., as discussed above with reference to block 1110 of FIG. 11), or sending measurements to another entity (e.g., a network node or location server) for that entity to calculate the first device GD.

At 1420, the first device transmits, to a second device (e.g., a UE or network node), a measurement signal (e.g., an RTTM signal). The measurement signal may be transmitted on a second frequency or via a second RAT (e.g., a FDD RAT).

At 1430, the first device receives, from the second device, a response signal (e.g., a RTTR signal). Like the measurement signal, the response signal may be transmitted on the second frequency or via the second RAT (e.g., a FDD RAT).

At 1440, the first device determines an RTT between the first device and the second device based on the measurement signal, the response signal, and the first device GD.

In an aspect, a payload of the response signal may include a GD of the second device (e.g., a Tx chain GD, a Rx chain GD, or a total GD). In that case, the first device may determine the RTT based further on the GD of the second device.

Figure 15:
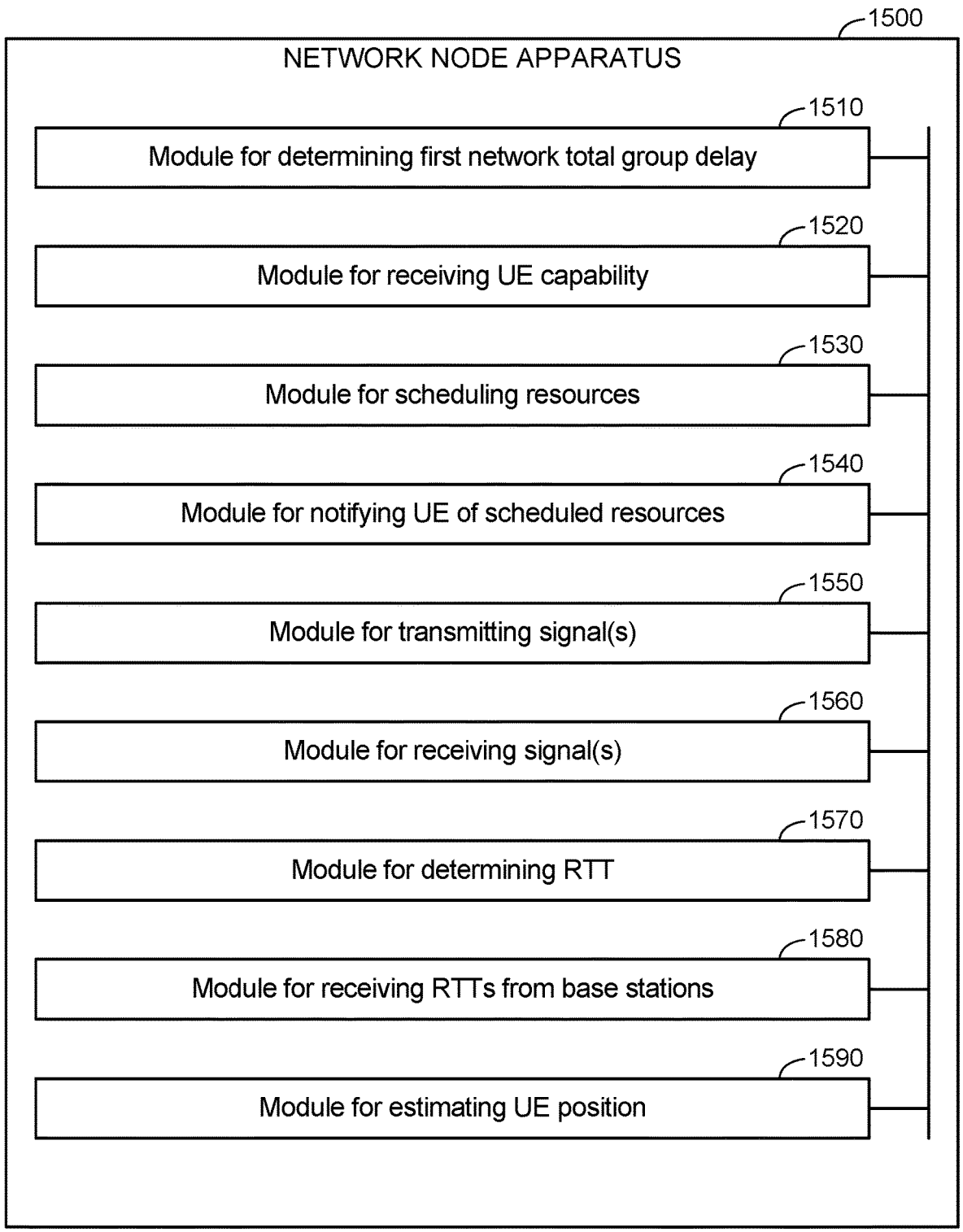
FIGS. 15 and 16 are other simplified block diagrams of several sample aspects of apparatuses configured to support positioning and communication as taught herein.

FIG. 15 illustrates an example network node apparatus 1500 (e.g., apparatus 304 of FIG. 3) represented as a series of interrelated functional modules connected by a common bus. Each of the modules may be implemented in hardware or as a combination of hardware and software. For example, the modules may be implemented as any combination of the components of the apparatus 304. A module for determining first network node total GD 1510 may correspond at least in some aspects to, for example, a processing system, such as processing system 334 in FIG. 3, as discussed herein. A module for receiving UE capability 1520 may correspond at least in some aspects to, for example, a communication device, such as communication device 314 in FIG. 3, and/or a processing system, such as processing system 334 in FIG. 3, as discussed herein. A module for scheduling resources 1530 may correspond at least in some aspects to, for example, a processing system, such as processing system 334 in FIG. 3, as discussed herein. A module for notifying UE of scheduled resources 1540 may correspond at least in some aspects to, for example, a communication device, such as communication device 314 in FIG. 3, and/or a processing system, such as processing system 334 in FIG. 3, as discussed herein. A module for transmitting signal(s) 1550 (e.g., RTTM signals, test signals, etc.) may correspond at least in some aspects to, for example, a communication device, such as communication device 314 in FIG. 3, and/or a processing system, such as processing system 334 in FIG. 3, as discussed herein. A module for receiving signal(s) 1560 (e.g., RTTR signals, test signals, etc.) may correspond at least in some aspects to, for example, a communication device, such as communication device 314 in FIG. 3, and/or a processing system, such as processing system 334 in FIG. 3, as discussed herein. A module for determining RTT 1570 may correspond at least in some aspects to, for example, a processing system, such as processing system 334 in FIG. 3, as discussed herein. A module for receiving RTTs 1580 may correspond at least in some aspects to, for example, a communication device, such as communication device 314 in FIG. 3, and/or a processing system, such as processing system 334 in FIG. 3, as discussed herein. A module for estimating 1590 may correspond at least in some aspects to, for example, a processing system, such as processing system 334 in FIG. 3, as discussed herein.

Figure 16:
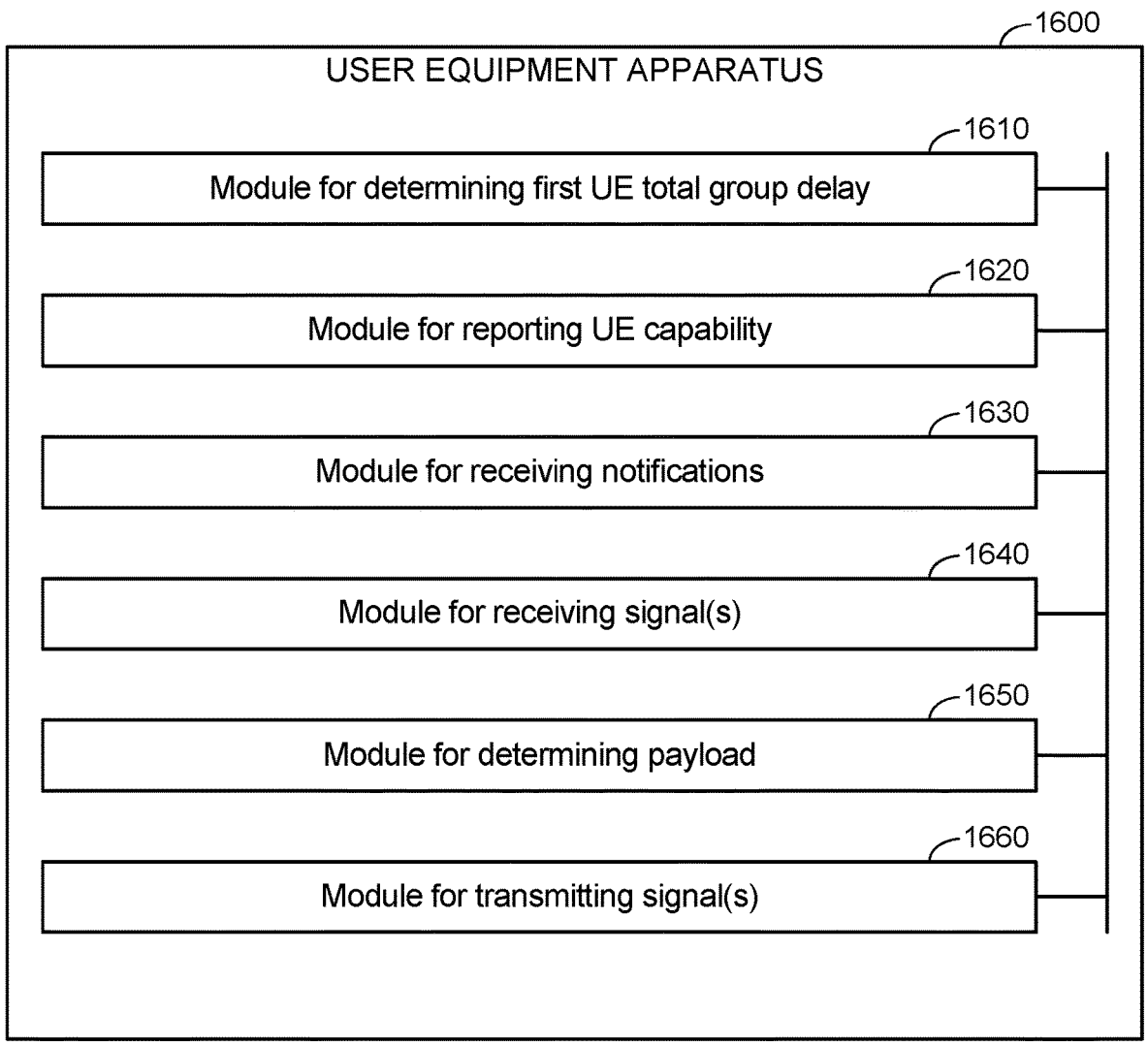

FIG. 16 illustrates an example user equipment apparatus 1200 represented as a series of interrelated functional modules connected by a common bus. Each of the modules may be implemented in hardware or as a combination of hardware and software. For example, the modules may be implemented as any combination of the apparatus 302. A module for determining first UE total GD 1610 may correspond at least in some aspects to, for example, a processing system, such as processing system 332 in FIG. 3, as discussed herein. A module for reporting UE capability 1220 may correspond at least in some aspects to, for example, a communication device, such as communication device 308 in FIG. 3, and/or a processing system, such as processing system 332 in FIG. 3, as discussed herein. A module for receiving notifications 1230 may correspond at least in some aspects to, for example, a communication device, such as communication device 308 in FIG. 3, and/or a processing system, such as processing system 332 in FIG. 3, as discussed herein. A module for receiving signal(s) 1630 (e.g., RTTM signals, test signals, etc.) may correspond at least in some aspects to, for example, a communication device, such as communication device 308 in FIG. 3, and/or a processing system, such as processing system 332 in FIG. 3, as discussed herein. A module for determining payload 1650 may correspond at least in some aspects to, for example, a processing system, such as processing system 332 in FIG. 3, as discussed herein. A module for transmitting signal(s) 1660 (e.g., RTTR signals, test signals, etc.) may correspond at least in some aspects to, for example, a communication device, such as communication device 308 in FIG. 3, and/or a processing system, such as processing system 332 in FIG. 3, as discussed herein.

The functionality of the modules of FIGS. 15-16 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 15-16, as well as other components and functions described herein, may be implemented using any suitable means. Such means also may be implemented, at least in part, using corresponding structure as taught herein. For example, the components described above in conjunction with the "module for" components of FIGS. 15-16 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A network node, comprising:
one or more transceivers;
one or more memory components; and
one or more processors communicatively coupled to the one or more transceivers and the one or more memory components, the one or more processors configured to:
transmit, via the one or more transceivers, a first measurement signal;
receive, via the one or more transceivers, a first response signal, the first response signal corresponding to the first measurement signal;
transmit, to a user equipment (UE) via the one or more transceivers, a second measurement signal, the first and second measurement signals being on different frequencies;
receive, from the UE via the one or more transceivers, a second response signal, the second response signal corresponding to the second measurement signal; and
determine a first roundtrip time (RTT) between the UE and the network node based on the second measurement signal, the second response signal, and a first network node group delay (GD), the first network node GD determined based on the first measurement signal and the first response signal.

2. The network node of claim 1, wherein the network node opportunistically transmits the first measurement signal, receives the first response signal, and determines the first network node GD based on a load on the network node being less than a threshold.

3. The network node of claim 1, wherein:
the first network node GD comprises a first network node Tx GD and a first network node Rx GD,
the first network node Tx GD indicates an interval between a measured transmission time of a first network node Tx signal transmitted through the first network node Tx chain of the network node and an actual transmission time of the first network node Tx signal leaving the network node, and
the first network node Rx GD indicates an interval between an actual arrival time of a first network node Rx signal received through the first network node Rx chain of the network node and a measured arrival time of the first network node Rx signal,
the first measurement signal is transmitted through the first network node Tx chain of the network node and the second measurement signal is transmitted through a second network node Tx chain of the network node, and
the first response signal is received through the first network node Rx chain of the network node and the second response signal is received through a second network node Rx chain of the network node.

4. The network node of claim 3, wherein:
the first measurement signal is a test radio frequency (RF) signal from a transmit antenna of the network node on a self-transmit resource transmitted at transmit time tt, the test RF signal being converted from a test signal through the first network node Tx chain, the transmit time tt being a time in a digital domain and corresponding to a frame, subframe, or a slot of the self-transmit resource in which symbols of the test signal are scheduled for transmission,
the first response signal is a reception of the test signal at receive time tr, the test signal being converted from the test RF signal through the first network node Rx chain, the receive time tr being a time in the digital domain and corresponding to a frame, subframe, or a slot of the self-receive resource in which received symbols contained therein are recognized as the symbols of the test signal, and
the network node GD is determined based on the transmit time tt and the receive time tr.

5. The network node of claim 1, wherein:
the network node transmits the first measurement signal and receives the first response signal in a time-division duplex (TDD) RAT, and
the network node transmits the second measurement signal and receives the second response signal in a frequency-division duplex (FDD) RAT.

6. The network node of claim 1, wherein:
the first response signal comprises a first response payload from the UE that includes a first UE total GD comprising a first UE Tx GD and a first UE Rx GD,
the first UE Tx GD indicates an interval between a measured transmission time of a first UE Tx signal transmitted through a first UE Tx chain of the UE and an actual transmission time of the first UE Tx signal leaving the UE,
the first UE Rx GD indicates an interval between an actual arrival time of a first UE Rx signal from the network node received through a first UE Rx chain of the UE and a measured arrival time of the first UE Rx signal, and
a first measured total time (t4(1)–t1(1)) is determined indicating an interval between a first measured measurement signal Tx time t1(1) of the first measurement signal from the network node and a first measured response signal Rx time t4(1) of the first response signal at the network node.

7. The network node of claim 6,
wherein the first response payload also includes (t3(1)–t2(1)), which is a first measured UE turn-around time indicating a time interval between a first measured signal Rx time t2(1) of the first measurement signal at the UE and a first measured response Tx time t3(1) of the first response signal from the UE, and
wherein the one or more processors are configured to determine the first RTT as:
first RTT=(t4(1)–t1(1))–(t3(1)–t2(1))–/(delays(1)),
where Σ(delays(1))=first network node total GD+first UE total GD.

8. The network node of claim 6,
wherein the second response payload includes a measuredRxdeltaDL(1, 2) indicating an interval between a first measured measurement signal Rx time t2(1) of the first measurement signal and a second measured measurement signal Rx time t2(2) of the second measurement signal at the UE, and
wherein the one or more processors are configured to:
determine a measuredRxdeltaUL(1, 2) (t4(1)–t4(2)) indicating an interval between a first response signal Rx time t1(1) of the first response signal and a second response signal Rx time t4(2) of the second response signal at the network node; and
determine a second RTT as:

second RTT=first RTT+measuredRxdeltaDL(1,2)
+measuredRxdeltaUL(1,2).

9. The network node of claim 6,
wherein the second response payload includes a GDdeltaDL(1,2) indicating a sum of:
   an interval between a first measured measurement signal Tx time t1 (1) of the first measurement signal from the network node and a second measured measurement signal Tx time t1 (2) of the second measurement signal from the network node, and
   an interval between a first measured measurement signal Rx time t2(1) of the first measurement signal at the UE and a second measured measurement signal Rx time t2(2) of the second measurement signal at the UE,
wherein the one or more processors are configured to:
   determine a GDdeltaUL(1,2) indicating a sum of:
      an interval between a first measured response signal Tx time t3(1) of the first response signal from the UE and a second measured response signal Tx time t3(2) of the second response signal from the UE, and
      an interval between a first response signal Rx time t4(1) of the first response signal at the network node and a second response signal Rx time t4(2) of the second response signal at the network node; and
   determine a second RTT as:
      second RTT=first RTT+GDdeltaDL(1,2)+GDdeltaUL(1,2).

10. The network node of claim 6,
wherein the first response payload also includes (t3' (1)—t2' (1)), which is a first actual UE turn-around time indicating a time interval between a first actual signal Rx time t2'(1) of the first measurement signal at the UE and a first actual response signal Tx time t3' (1) of the first response signal from the UE, and
wherein the one or more processors are configured to determine the first RTT as:
   first RTT=(t4(1)−t1 (1))−(t3'(1)−t2'(1))−first network node total GD.

11. The network node of claim 10, wherein:
the second response payload includes a measuredRxdeltaDL(1,2) and a measuredTxdeltaUL(1,2),
the measuredRxdeltaDL(1,2) (t2(1)−t2(2)) indicates an interval between a first measured measurement signal Rx time t2(1) of the first measurement signal at the UE and a second measured measurement signal Rx time t2(2) of the second measurement signal at the UE, and
the measuredTxdeltaUL(1,2) (t3(1)−t3(2)) indicates an interval between a first measured response signal Tx time t3(1) of the first response signal from the UE and a second measured response signal Tx time t3(2) of the second response signal from the UE.

12. The network node of claim 11,
wherein a measuredTxdeltaDL(1, 2) and a measuredRxdeltaUL(1, 2) are determined at the network node,
the measuredTxdeltaDL(1, 2)−(t1(1)−t1(2)) indicates an interval between a first measurement signal Tx time t1(1) of the first measurement signal from the network node and a second measurement signal Tx time t1(2) of the second measurement signal from the network node, and
the measuredRxdeltaUL(1, 2) (t4(1)−t4(2)) indicates an interval between a first response signal Rx time t4(1) of the first response signal at the network node and a second response signal Rx time t4(2) of the second response signal at the network node, and
wherein the one or more processors are configured to determine a second RTT as:
   second RTT=(t4(2)−t1 (2))−(t3(2)−t2(2))−/(delays(2)),
   where/(delays(2))=/(delays(1))+GDdeltaDL(1,2)+GDdeltaUL(1,2),
   Σ(delays(1))=first network node total GD+first UE total GD,
   GDdeltaDL(1,2)=−measuredTxdeltaDL(1,2)+measuredRxdeltaDL(1,2), and
   GDdeltaUL(1,2)=−measuredTxdeltaUL(1,2)+measured RxdeltaUL(1,2).

13. The network node of claim 1, wherein the one or more processors are further configured to:
   receive a request for scheduling of self-transmit and self-receive resources respectively from the UE, the self-transmit and self-receive resources comprising physical layer resources;
   schedule the requested self-transmit and self-receive resources for the UE; and
   notify the UE of the scheduled self-transmit and self-receive resources.

14. The network node of claim 1, wherein the first and second network node Tx chains are different, the first and second network node Rx chains are different, or both.

15. A user equipment (UE), comprising:
   one or more transceivers;
   one or more memory components; and
   one or more processors communicatively coupled to the one or more transceivers and the one or more memory, the one or more processors configured to:
      obtain a first UE group delay (GD) associated with a first frequency or a first radio access technology (RAT);
      receive, from a network node via the one or more transceivers, a measurement signal, the measurement signal received on a second frequency;
      transmit, to the network node via the one or more transceivers, a response signal, the second response signal corresponding to the second measurement signal; and
      enable a roundtrip time (RTT) between the UE and the network node to be determined based on the measurement signal, the response signal, and the first UE GD.

16. The UE of claim 15, wherein the one or more processors being configured to enable comprises the one or more processors being configured to calculate the RTT based on the measurement signal, the response signal, and the first UE GD.

17. The UE of claim 15, wherein:
   the first UE GD comprises a first UE transmission (Tx) GD and a first UE reception (Rx) GD,
   the first UE Tx GD indicates an interval between a measured transmission time of a first UE Tx signal transmitted through a first UE Tx chain of the UE and an actual transmission time of the first UE Tx signal leaving the UE, and
   the first UE Rx GD indicates an interval between an actual arrival time of a first UE Rx signal from the network node received through a first UE Rx chain of the UE and a measured arrival time of the first UE Rx signal.

18. The UE of claim 15, wherein the one or more processors being configured to obtain comprises the one or more processors being configured to:

transmit a test radio frequency (RF) signal from a transmit antenna of the UE on self-transmit resources at transmit time tt, the test RF signal being converted from a test signal through the first UE Tx chain, the transmit time tt being a time in a digital domain and corresponding to a frame, subframe, or a slot of the self-transmit resource in which symbols of the test signal are scheduled for transmission;

receive the test RF signal on the self-receive resources and detect the reception of the test signal at receive time tr, the test signal being converted from the test RF signal through the first UE Rx chain, the receive time tr being a time in the digital domain and corresponding to a frame, subframe, or a slot of the self-receive resource in which received symbols contained therein are recognized as the symbols of the test signal; and determine the first UE GD based on the transmit time tt and the receive time tr.

19. The UE of claim 18, wherein the first RAT is a time-division duplex (TDD) RAT.

20. The UE of claim 18, wherein the UE opportunistically transmits the test RF signal, receives the test signal, and determines the first UE GD based on a time of day.

21. The UE of claim 18, wherein the one or more processors being configured to enable comprises the one or more processors being configured to transmit, via the one or more transceivers, the first UE GD to the network node or a location server.

22. The UE of claim 21, wherein the one or more processors being configured to enable comprises the one or more processors being configured to transmit, via the one or more transceivers, a first measured UE turn-around time (t3(1)−t2(1)) indicating a time interval between a first measured measurement signal Rx time t2(1) of the test RF signal at the UE and a first measured response signal Tx time t3(1) of the test RF signal from the UE.

23. The UE of claim 22, wherein the one or more processors being configured to enable comprises the one or more processors being configured to transmit, via the one or more transceivers, a measuredRxdeltaDL(1,2) indicating an interval between a first measured measurement signal Rx time t2(1) of the test RF signal and a second measured measurement signal Rx time t2(2) of the test RF signal at the UE.

24. The UE of claim 22, wherein the response signal includes a GDdeltaDL(1,2) indicating a sum of:
an interval between a first measured measurement signal Tx time t1(1) of a first measurement signal from the network node and a second measured measurement signal Tx time t1(2) of the measurement signal from the network node, and
an interval between a first measured measurement signal Rx time t2(1) of the first measurement signal at the UE and a second measured measurement signal Rx time t2(2) of the measurement signal at the UE.

25. The UE of claim 21, wherein the one or more processors being configured to enable comprises the one or more processors being configured to transmit, via the one or more transceivers, a first actual UE turn-around time (t3'(1)−t2'(1)) indicating a time interval between a first actual signal Rx time t2' (1) of the test RF signal at the UE and a first actual response signal Tx time t3'(1) of the test RF signal from the UE.

26. The UE of claim 25, wherein the one or more processors being configured to enable comprises the one or more processors being configured to transmit, via the one or more transceivers, a measuredRxdeltaDL(1,2) and a measuredTxdeltaDL(1,2),
the measuredTxdeltaDL(1,2)−(t1(1)−t1(2)) indicating an interval between a first measurement signal Tx time t1(1) of a first measurement signal from the network node and a second measurement signal Tx time t1 (2) of the measurement signal from the network node, and
the measuredRxdeltaUL(1,2) (t4(1)−t4(2)) indicating an interval between a first response signal Rx time t4(1) of a first response signal at the network node and a second response signal Rx time t4(2) of the response signal at the network node.

27. The UE of claim 15, wherein the first and second UE Tx chains are different, the first and second UE Rx chains are different, or both.

28. A method of operating a network node, the method comprising:
transmitting a first measurement signal;
receiving a first response signal, the first response signals corresponding to the first measurement signals;
transmitting, to a user equipment (UE), a second measurement signal, the first and second measurement signals being on different frequencies;
receiving, from the UE, a second response signal, the second response signal corresponding to the second measurement signal; and
determining a roundtrip time (RTT) between the UE and the network node based on the second measurement signal, the second response signal, and a first network node group delay (GD), the first network node GD determined based on the first measurement signal and the first response signal.

29. The method of claim 28, wherein the first and second network node Tx chains are different, the first and second network node Rx chains are different, or both.

30. A method of operating a user equipment (UE), the method comprising:
obtaining a first UE group delay (GD) associated with a first frequency or a first radio access technology (RAT);
receiving, from a network node, a measurement signal, the measurement signal received on a second frequency;
transmitting, to the network node, a response signal, the response signal corresponding to the measurement signal; and
enabling a roundtrip time (RTT) between the UE and the network node to be determined based on the measurement signal, the response signal, and the first UE GD.

* * * * *